(12) United States Patent
Endo

(10) Patent No.: US 7,538,957 B2
(45) Date of Patent: May 26, 2009

(54) PHOTOGRAPHING OPTICAL SYSTEM AND IMAGE PICKUP APPARATUS INCLUDING THE SAME

(75) Inventor: Hiroshi Endo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/869,666

(22) Filed: Oct. 9, 2007

(65) Prior Publication Data
US 2008/0088950 A1 Apr. 17, 2008

(30) Foreign Application Priority Data
Oct. 11, 2006 (JP) ............................ 2006-277725

(51) Int. Cl.
*G02B 3/00* (2006.01)
(52) U.S. Cl. ...................... 359/754; 359/737
(58) Field of Classification Search ................. 359/754, 359/737
See application file for complete search history.

(56) References Cited

U.S. PATENT DOCUMENTS

| 6,115,188 A | 9/2000 | Nishio |
| 6,381,079 B1 | 4/2002 | Ogawa |

2004/0161228 A1  8/2004  Nanba

FOREIGN PATENT DOCUMENTS

EP  1659422  5/2006

OTHER PUBLICATIONS

A. Ozturk, Influence of Ba(PO3)2 additions on the refractive index and dispersions of fluoride glasses, Glass Technol., 2000, 41(3), pp. 106-108.

*Primary Examiner*—Darryl J Collins
(74) *Attorney, Agent, or Firm*—Canon USA Inc IP Div

(57) ABSTRACT

A photographing optical system includes at least one of a positive lens and diffractive optical element being provided closer to an object side of the system than an intersection P of a light axis and paraxial chief ray, and a negative lens, provided closer to an image side than the intersection. The positive lens and the negative lens are formed of materials satisfying the following conditions when the maximum height of a paraxial marginal ray, passing through a lens surface, from the light axis at a location closer to the object side than the intersection is greater than a maximum height of the paraxial marginal ray, passing through a lens surface, from the light axis at a location closer to the image than the intersection:

$-0.0015 \times vd + 0.6425 < \theta gF$ $60 < vd$ where $vd$ is an Abbe number and $\theta gF$ is a partial dispersion ratio.

29 Claims, 13 Drawing Sheets

… (US 7,538,957 B2)

PHOTOGRAPHING OPTICAL SYSTEM AND IMAGE PICKUP APPARATUS INCLUDING THE SAME

BACKGROUND OF THE INVENTION

Field of the Invention

The present invention relates to a photographing optical system, which is suitable for an image pickup apparatus, such as a photographic camera, a video camera, or a digital camera.

As a related photographing optical system having a long focal length, a telephoto-type photographing optical system (telephoto lens) including, in order of lens units from an object side to an image side, a front lens unit having a positive refractive power and a rear lens unit having a negative refractive power is known.

In general, in a telephoto lens having a long focal length, as the focal length is increased, for example, axial chromatic aberration and chromatic aberration of magnification among various aberrations are particularly increased.

A telephoto lens that corrects the chromatic aberrations as a result of combining a positive lens and a negative lens has been proposed. The positive lens is formed using a low-dispersion material having extraordinary dispersion. The negative lens is formed using a high-dispersion material. This is described in U.S. Pat. No. 6,115,188.

As a method of correcting chromatic aberrations of a photographing optical system, a method using a diffractive optical element is known, as described for example in U.S. Pat. No. 6,381,079.

In U.S. Pat. No. 6,381,079, the photographing optical system includes, in order of lens units from an object side to an image side, a first lens unit having a positive refractive power, a second lens unit having a negative refractive power, and a third lens unit. The chromatic aberrations are corrected using a diffractive optical element in the first lens unit.

In general, for a telephoto lens including a refractive optical system to achieve a predetermined optical performance, a certain overall lens length is required in accordance with the F number and focal length.

When the positive refractive power of the front lens unit and the negative refractive power of the rear lens unit are increased, the overall lens length can be reduced. However, a large amount of chromatic aberration occurs. Even if an extraordinary-dispersion glass, formed of, for example, fluorite, is used for the object-side positive lens of the optical system, it is difficult to properly correct both axial chromatic aberration and chromatic aberration of magnification.

In addition, when a diffractive optical element is used in the optical system, while reducing the overall lens length, chromatic aberrations are properly corrected, so that high optical performance is easily achieved. However, when the overall lens length is made excessively short, the chromatic aberrations may not both be properly corrected.

SUMMARY OF THE INVENTION

The present invention provides a telephoto-type photographing optical system having a short overall lens length and having chromatic aberrations properly corrected, and an image pickup apparatus including the same.

The present invention provides, in its first aspect, a photographing optical system including at least one of a positive lens and a diffractive optical element being provided closer to the object side of the system than the intersection P of the light axis and a paraxial chief ray; and a negative lens provided closer to the image side of the system than the intersection P. The positive lens and the negative lens are both formed of materials satisfying the following two conditions when the maximum height of a paraxial marginal ray, passing through a lens surface, from the light axis at a location closer to the object side than the intersection P is greater than a maximum height of the paraxial marginal ray, passing through a lens surface, from the light axis at a location closer to the image side than the intersection P:

$$-0.0015 \times vd + 0.6425 < \theta gF, \text{ and}$$

$$60 < vd$$

where $vd$ is the Abbe number and $\theta gF$ is the partial dispersion ratio.

According to a second aspect of the present invention, there is provided a telephoto-type photographing optical system having a short overall lens length and having chromatic aberrations properly corrected, and an image pickup apparatus including the same.

Further features of the present invention will become apparent from the following description of exemplary embodiments with reference to the attached drawings.

DESCRIPTION OF THE EMBODIMENTS

Figure 1:
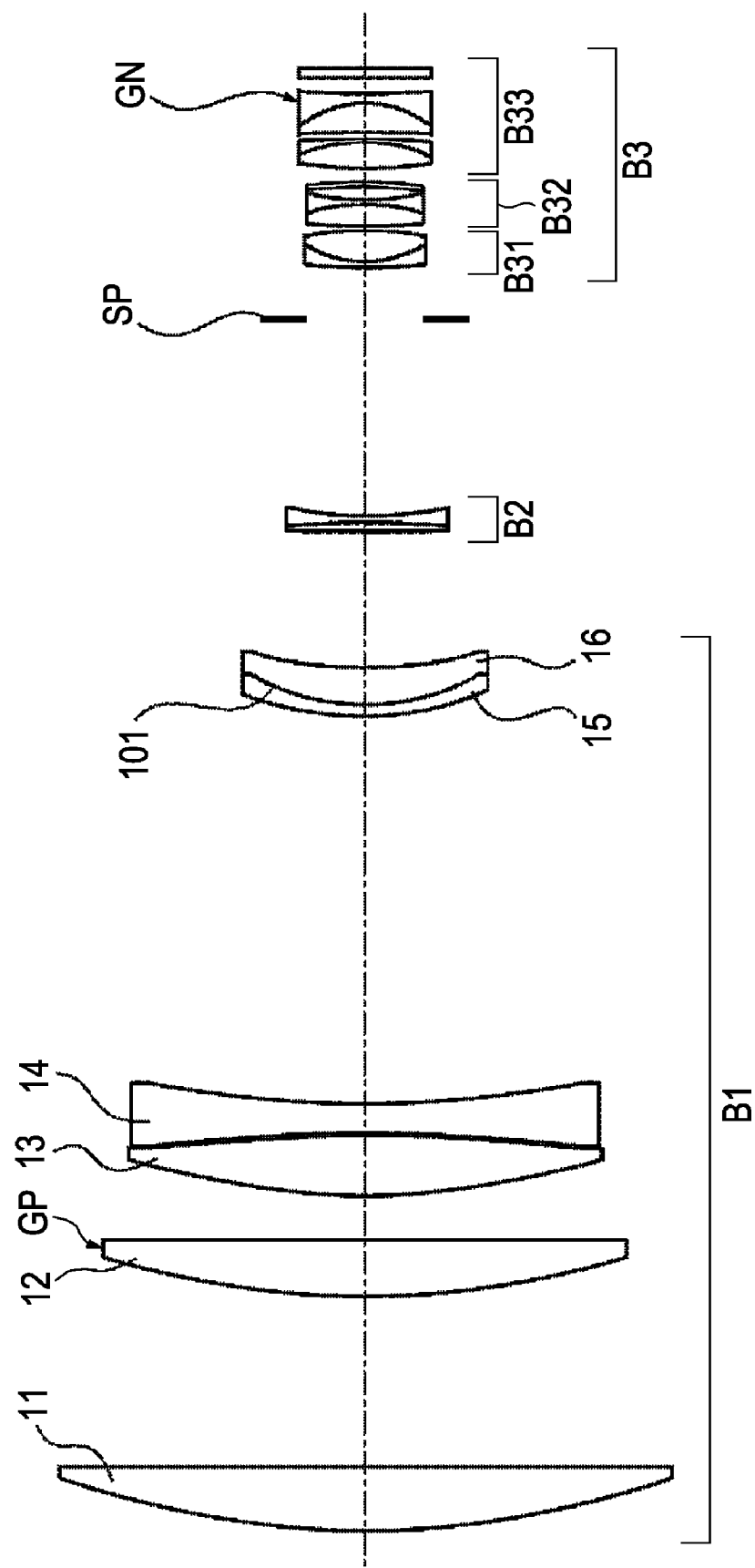
FIG. 1 is a sectional view of a photographing optical system according to a first numerical example of the present invention.
Figure 2:
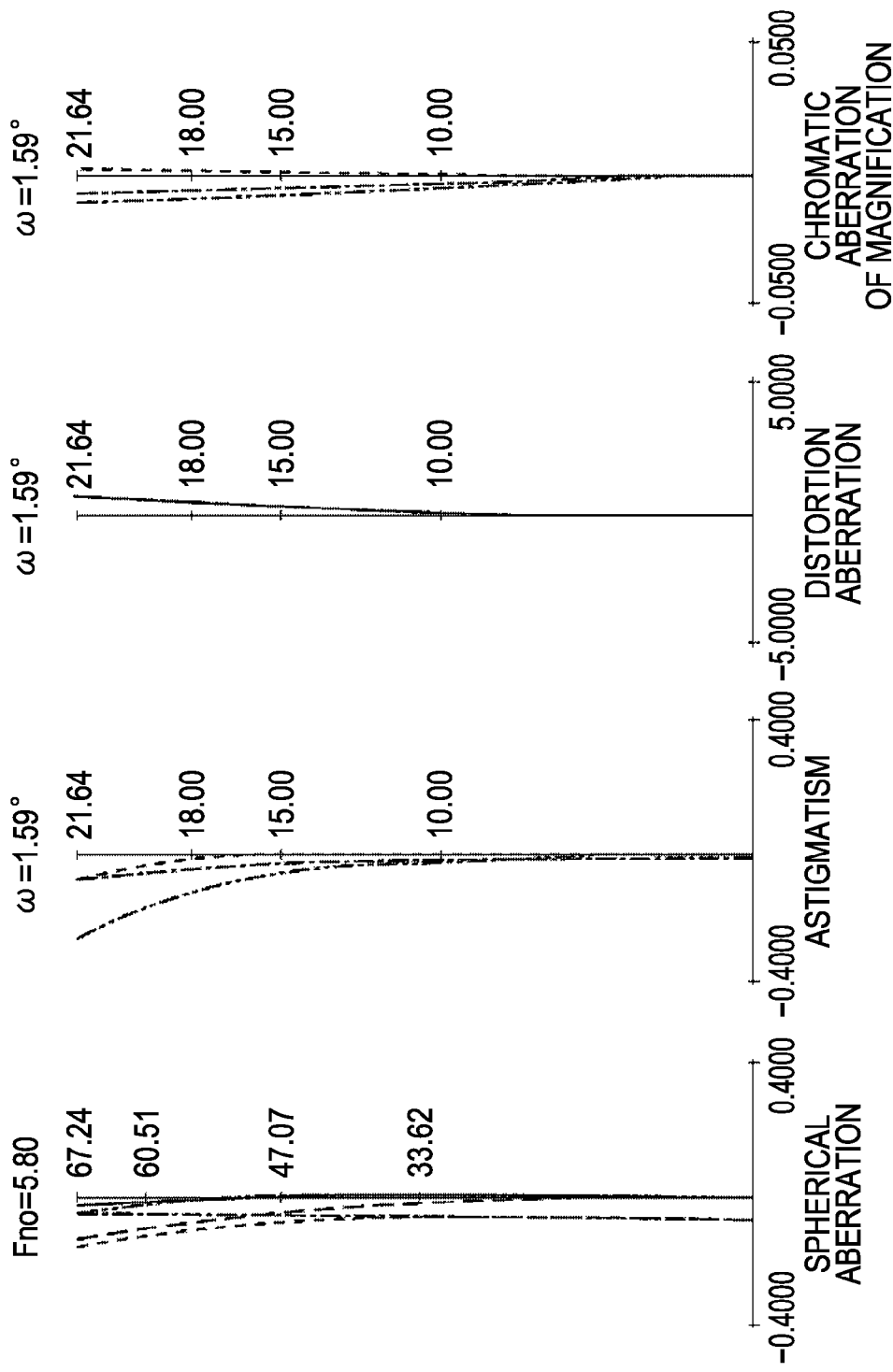
FIG. 2 illustrates aberrations when an object distance is an infinite distance in the first numerical example of the present invention.
Figure 3:
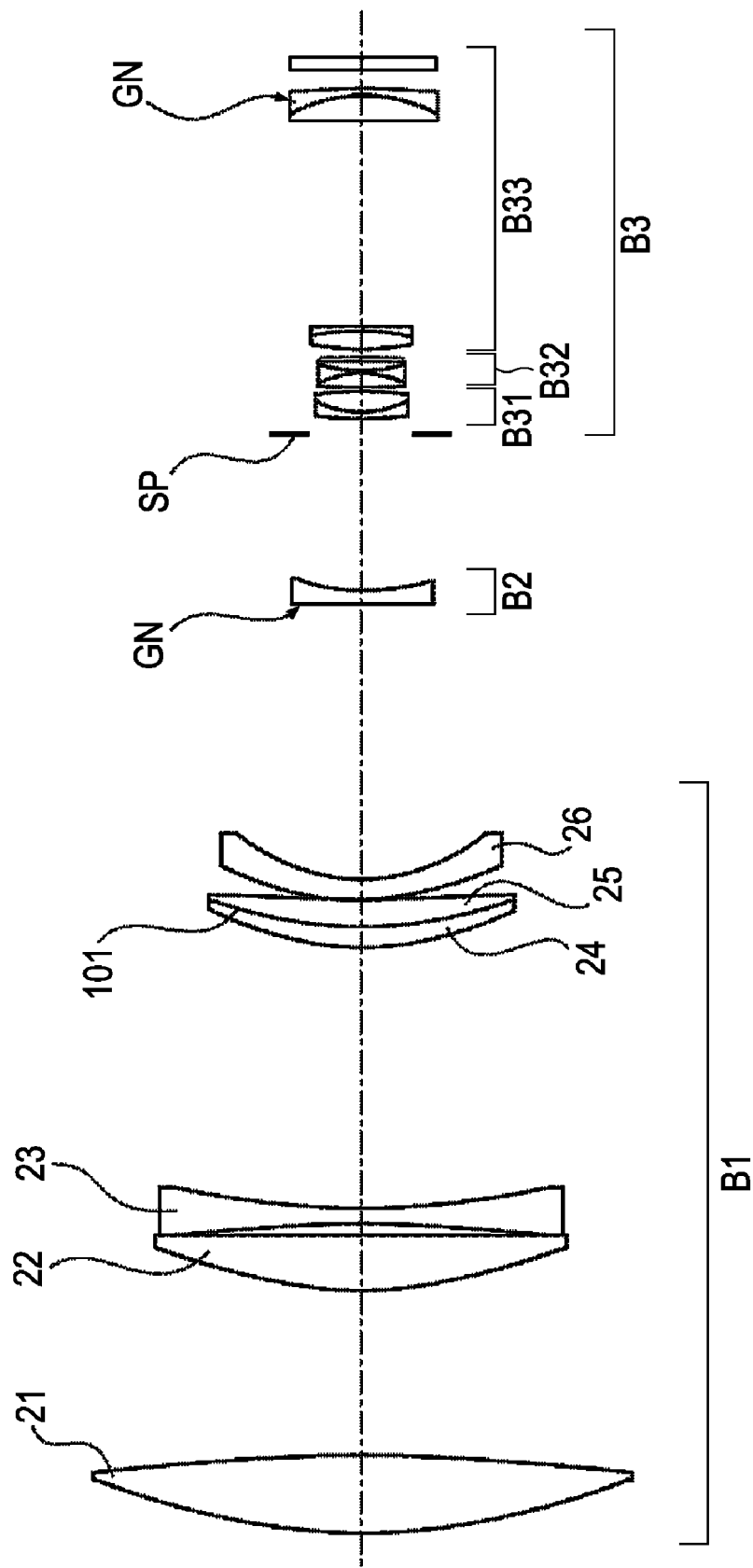
FIG. 3 is a sectional view of a photographing optical system according to a second numerical example of the present invention.
Figure 4:
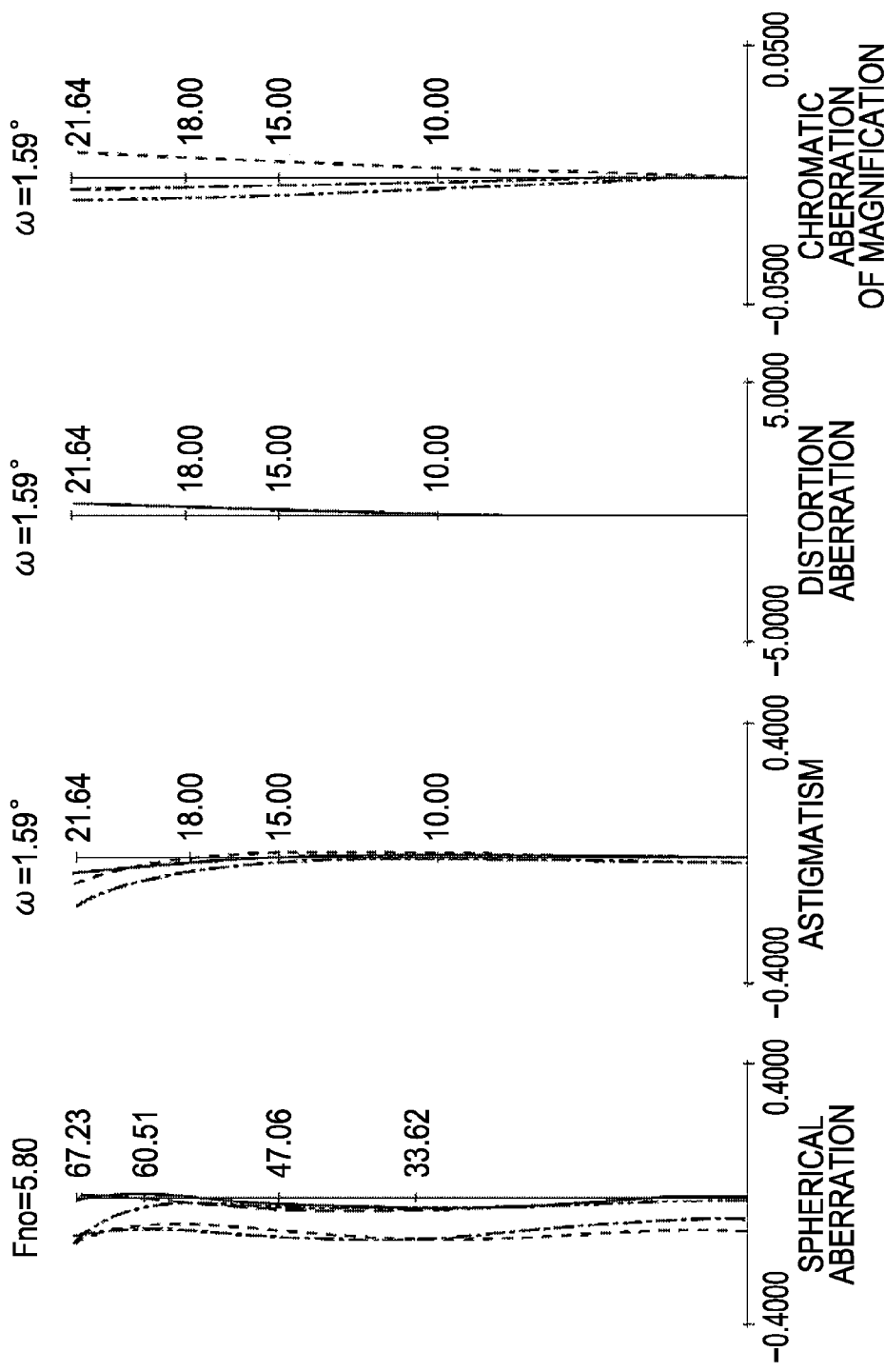
FIG. 4 illustrates aberrations when an object distance is an infinite distance in the second numerical example of the present invention.
Figure 5:
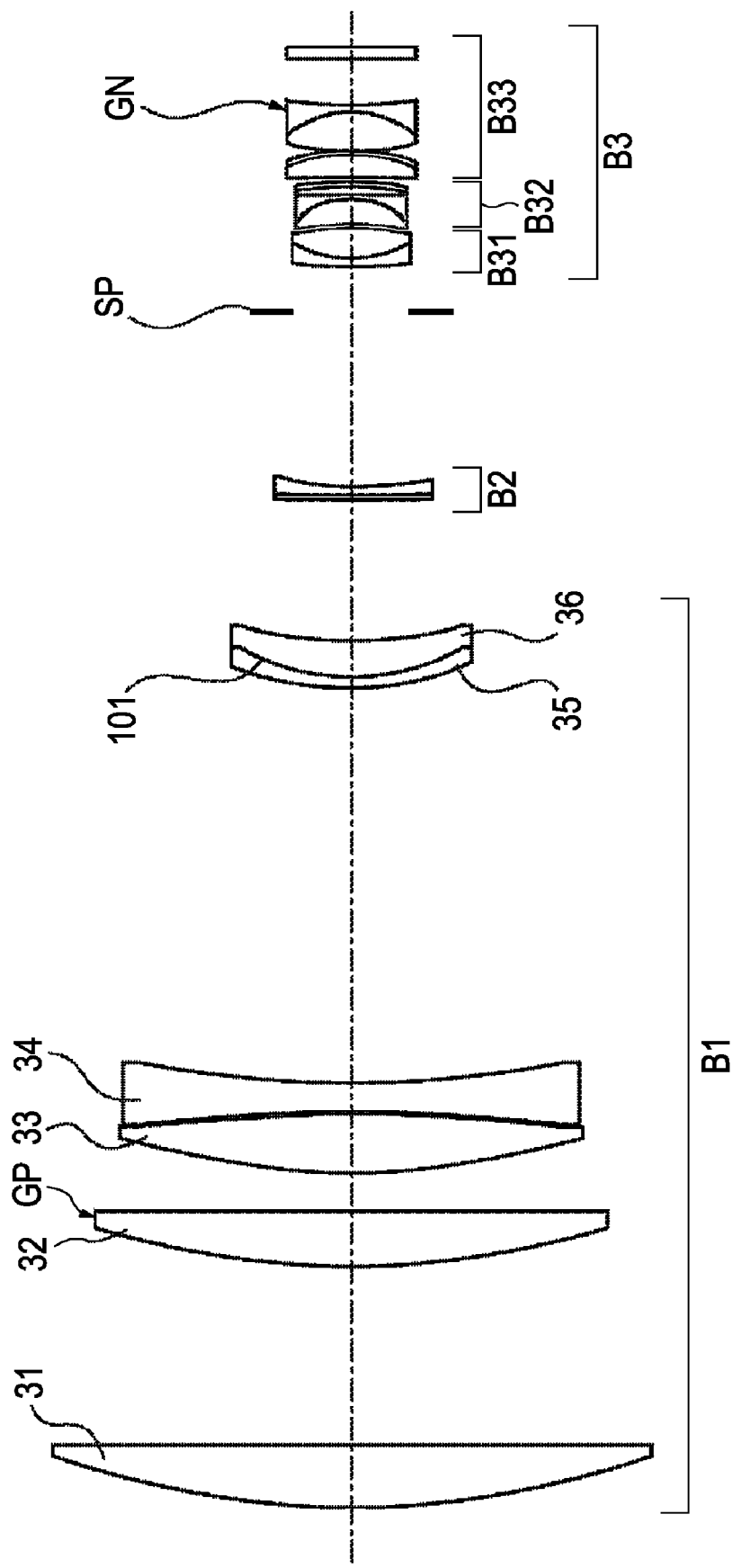
FIG. 5 is a sectional view of a photographing optical system according to a third numerical example of the present invention.
Figure 6:
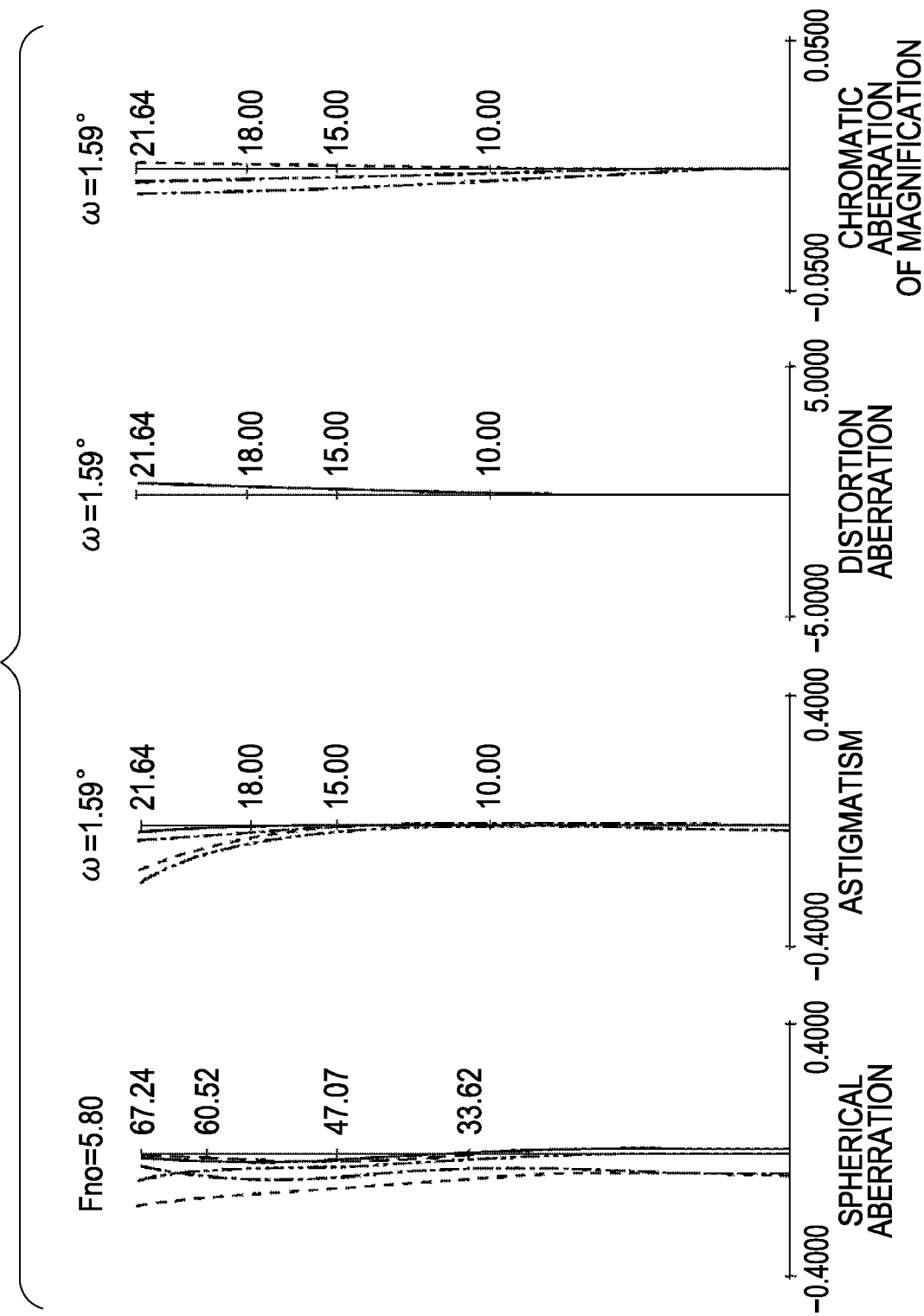
FIG. 6 illustrates aberrations when an object distance is an infinite distance in the third numerical example of the present invention.
Figure 7:
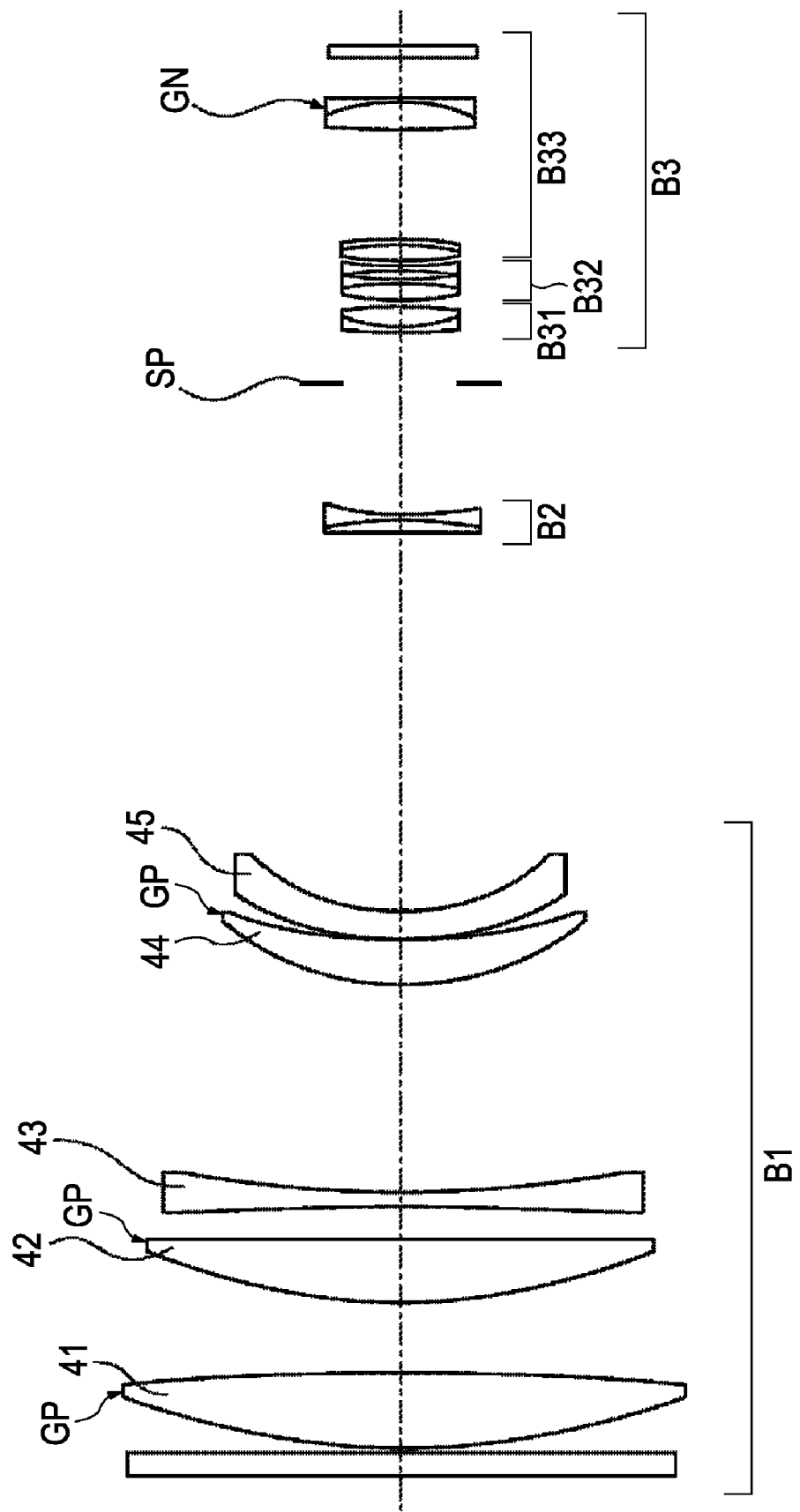
FIG. 7 is a sectional view of a photographing optical system according to a fourth numerical example of the present invention.
Figure 8:
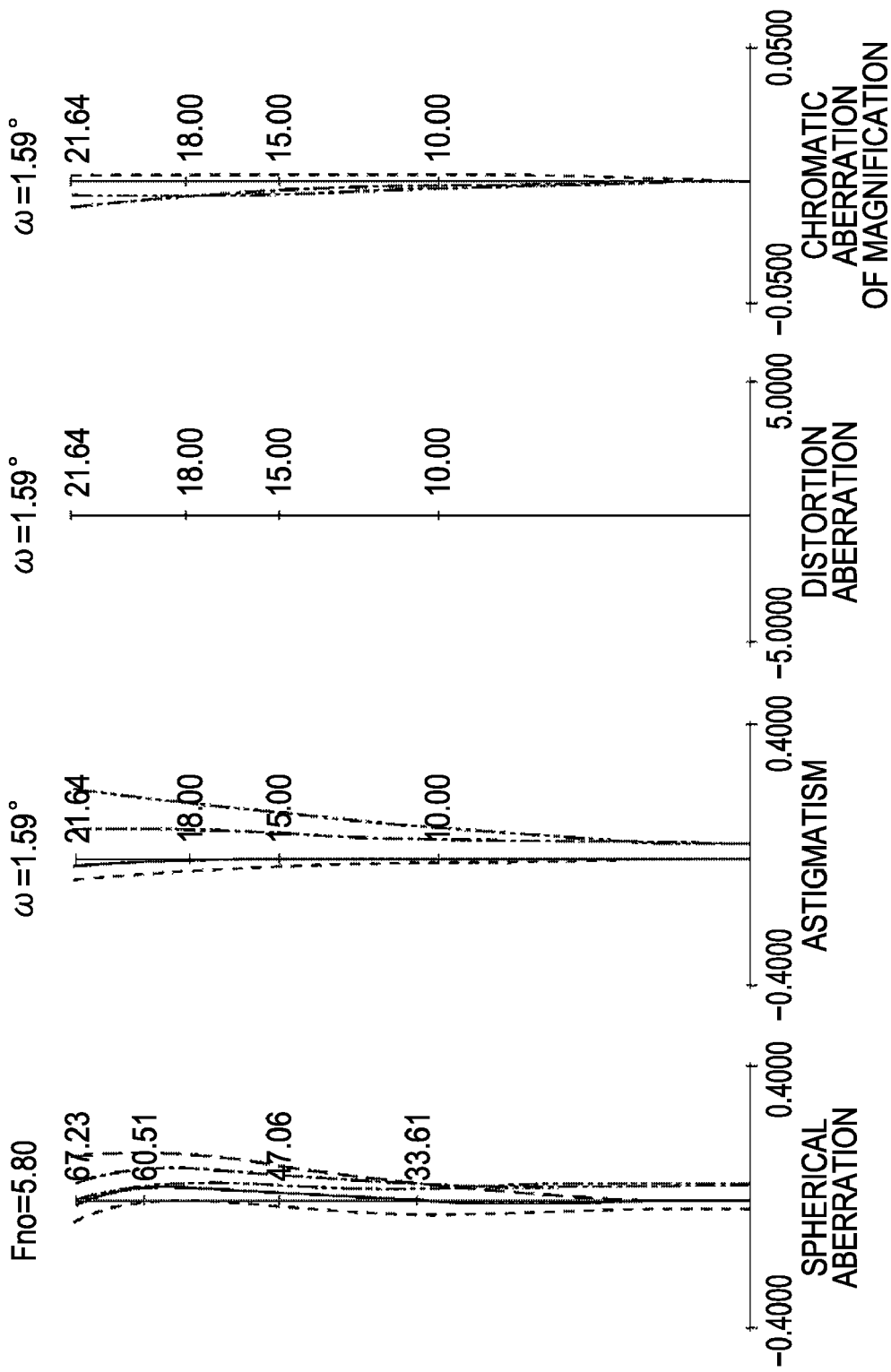
FIG. 8 illustrates aberrations when an object distance is an infinite distance in the fourth numerical example of the present invention.

FIGS. 1, 3, 5, and 7 are sectional views of lenses according to first to fourth numerical examples, respectively. In each sectional view of the lenses, the left side corresponds to an object side (enlargement side/front side), and the right side corresponds to an image side (reduction side/rear side). A photographing optical system in each numerical example is a telephoto-type photographing optical system. In the telephoto-type photographing optical system, where an intersection of a light axis and a paraxial chief ray is P, a maximum height of a paraxial marginal ray, passing through a lens surface, from the light axis at a location closer to the object side than the intersection P is greater than a maximum height of the paraxial marginal ray, passing through the lens surface, from the light axis at a location closer to the image side than the intersection P. A photographing optical system having a focal length that is longer than the overall lens length (that is, a length along the light axis from a lens surface closest to the object side to an image plane) is a telephoto-type photographing optical system.

In each numerical example, B1 denotes a first lens unit having a positive refractive power, B2 denotes a second lens unit having a negative refractive power, and B3 denotes a third lens unit having a positive refractive power. B31 denotes a 31st lens unit having a positive refractive power, B32 denotes a 32nd lens unit having a negative refractive power, and B33 denotes a 33rd lens unit having a positive refractive power. SP denotes an aperture stop.

The first lens unit B1 includes a first positive lens, disposed closest to the object side, a second positive lens, and other lenses behind the second positive lens. The second positive lens is separated from the first positive lens by a relatively long air interval. Focusing from an object point at infinity to a nearby object point is performed by moving the second lens unit B2 towards the image plane side. The 32nd lens unit B32 is moveable in a direction having a component that is perpendicular to the light axis, so that an image formed by the photographing optical system may be displaced perpendicularly to the light axis, thereby correcting image blurring caused by, for example, camera movement.

A positive lens GP, disposed in either the first lens unit B1 or the second lens unit B2, and a negative lens GN, disposed in the third lens unit B3, are formed of materials having extraordinary-dispersion characteristics.

The materials having extraordinary-dispersion characteristics satisfy the following Conditions (1) and (2):

$$-0.0015 \times vd + 0.6425 < \theta gF \quad (1)$$

$$60 < vd \quad (2)$$

where vd is the Abbe number and θgF is the partial dispersion ratio. When refractive indices of the materials with respect to the g-line (wavelength=435.8 nm), F-line (wavelength=486.1 nm), d-line (wavelength=587.6 nm), and a C-line (wavelength=656.3 nm) are Ng, Nd, NF, and NC, respectively, the Abbe number vd and the partial dispersion ratio θgF are represented as follows:

$$vd = (Nd-1)/(NF-NC)$$

$$\theta gF = (Ng-NF)/(NF-NC)$$

When the intersection of the light axis and the paraxial chief ray is P, the positive lens GP is disposed closer to the object side of the system than the intersection P (that is, closer to the object side than the aperture stop SP), and the negative lens GN is disposed closer to the image side of the system than the intersection P (that is, closer to the image side than the aperture stop SP).

Diffractive optical element 101 includes an optical member, such as a lens or a flat plate, and a diffractive optical part formed on a major surface of the optical member. The diffractive optical part includes a diffraction grating formed, for example, of an ultraviolet curable resin provided on the lens surface.

The lens structure according to the first numerical example is as follows. The first lens unit includes, in order of lenses from the object side, a positive lens 11, a positive lens 12 having extraordinary-dispersion characteristics, a cemented lens having a positive lens 13 and a negative lens 14 cemented to each other, and a cemented lens (diffractive optical element 101) including a diffractive optical part and having a negative lens 15 and a positive lens 16 cemented to each other. The second lens unit includes a cemented lens having a positive lens and a negative lens cemented to each other. The 31st lens unit includes a cemented lens having a negative lens and a positive lens cemented to each other. The 32nd lens unit includes a cemented lens having a positive lens and a negative lens cemented to each other, and a negative lens. The 33rd lens unit includes a cemented lens having a positive lens and a negative lens cemented to each other, a cemented lens having a positive lens and a negative lens GN (having extraordinary dispersion characteristics) cemented to each other, and a flat plate (inserted filter is assumed).

The lens structure according to the second numerical example is as follows. The first lens unit includes, in order of lenses from the object side, a positive lens 21, a positive lens 22, a negative lens 23, a cemented lens (diffractive optical element 101) including a diffractive optical part and having a positive lens 24 and a positive lens 25 cemented to each other, and a negative meniscus lens 26. The second lens unit includes a negative lens GN having extraordinary dispersion characteristics. The 31st lens unit includes a cemented lens having a negative lens and a positive lens cemented to each other. The 32nd lens unit includes a cemented lens having a positive lens and a negative lens cemented to each other, and a negative lens. The 33rd lens unit includes a cemented lens having a positive lens and a negative lens cemented to each other, a cemented lens having a positive lens and a negative lens GN (having extraordinary dispersion characteristics) cemented to each other, and a flat plate (inserted filter is assumed).

The lens structure according to the third numerical example is as follows. The first lens unit includes, in order of lenses from the object side, a positive lens 31, a positive lens 32 having extraordinary dispersion characteristics, a positive lens 33, a negative lens 34, and a cemented lens (diffractive optical element 101) including a diffractive optical part and having a negative lens 35 and a positive lens 36 cemented to each other. The second lens unit includes a cemented lens having a positive lens and a negative lens cemented to each other. The 31st lens unit includes a cemented lens having a negative lens and a positive lens cemented to each other. The 32nd lens unit includes a cemented lens having a positive lens and a negative lens cemented to each other, and a negative lens. The 33rd lens unit includes a cemented lens having a positive lens and a negative lens cemented to each other, a cemented lens having a positive lens and a negative lens GN (having extraordinary dispersion characteristics) cemented to each other, and a flat plate (inserted filter is assumed).

The lens structure according to the fourth numerical example is as follows. The first lens unit includes, from the object side, a protective glass, a positive lens 41 having extraordinary dispersion characteristics, a positive lens 42 having extraordinary dispersion characteristics, a negative lens 43, a positive lens 44 having extraordinary dispersion characteristics, and a negative meniscus lens 45. The second lens unit includes a cemented lens having a positive lens and a negative lens cemented to each other. The 31st lens unit includes a cemented lens having a negative lens and a positive lens cemented to each other. The 32nd lens unit includes a cemented lens having a positive lens and a negative lens cemented to each other, and a negative lens. The 33rd lens unit includes a cemented lens having a positive lens and a negative lens cemented to each other, a cemented lens having a positive lens and a negative lens GN (having extraordinary dispersion characteristics) cemented to each other, and a flat plate (inserted filter is assumed).

FIGS. 2, 4, 6, and 8 illustrate aberrations of the first to fourth numerical examples, respectively. In each spherical aberration diagram, a solid line represents a d line, an alternate long and two short dash line represents a g-line, an alternate long and short dash line represents a C-line, a dotted line represents an F-line, and a dashed line represents a sinusoidal condition. In each astigmatism diagram, a solid line represents a sagittal light ray and a dotted line represents a meridional light ray. In each chromatic-aberration-of-magnification diagram, an alternate long and two short dash line represents a g-line, an alternate long and short dash line represents a C-line, and a dotted line represents an F-line. ω represents a half angle of view, and Fno represents an F number. In each spherical aberration diagram, the vertical axis represents an entrance pupil diameter. In each astigmatism diagram, distortion aberration diagram, and chromatic-aberration-of-magnification diagram, the vertical axis represents image height.

Figure 9:
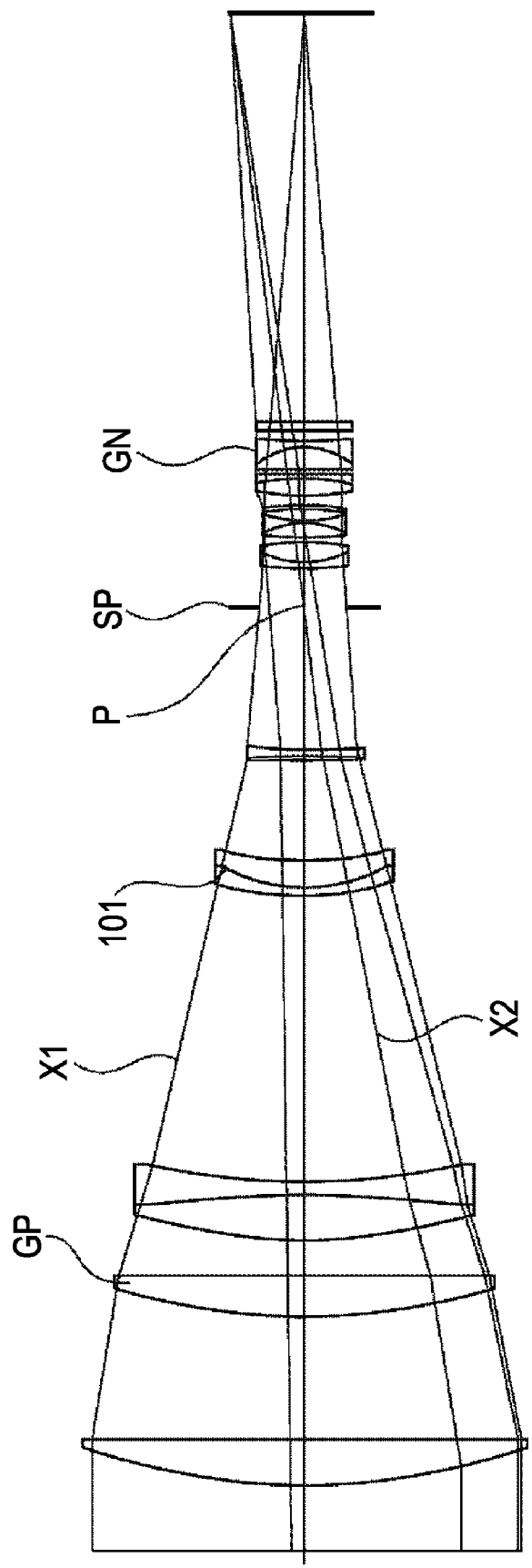
FIG. 9 shows a light path of the photographing optical system according to the first numerical example of the present invention.

At a side closer to the object side than the intersection P of the light axis and the paraxial chief ray (that is, at the side closer to the object side than the aperture stop SP), at least one of the diffractive optical element 101 and the positive lens GP, formed of an extraordinary dispersion material, is disposed. At a side closer to the image side than the intersection P (that is, at the side closer to the image side than the aperture stop SP), the negative lens GN, formed of an extraordinary dispersion material, is disposed. These dispositions effectively correct axial chromatic aberration and chromatic aberration of magnification. This will be described in more detail with reference to FIG. 9, which illustrates a light path of the photographing optical system according to the first numerical example. In the diffractive optical element 101 and the positive lens GP, a paraxial marginal ray X1 and a paraxial chief ray X2 have different signs (that is, they pass on opposite sides of the light axis). Therefore, by the extraordinary dispersion characteristics of the positive lens GP and the diffractive optical element 101, the axial-chromatic-aberration g-line is corrected in a minus direction and the chromatic-aberration-of-magnification g-line is corrected in a plus direction. In a subsystem of the first lens unit B1, the axial chromatic aberration is excessively corrected in the minus direction, and the chromatic aberration of magnification is insufficiently corrected in the plus direction. Therefore, at the negative lens GN, disposed closer to the image side than the intersection point P of the light axis and the paraxial chief ray X2 (that is, closer to the image side than the aperture stop SP), the paraxial marginal ray X1 and the paraxial chief ray X2 have the same sign (that is, they pass the same side of the light axis). Therefore, by the extraordinary dispersion characteristics of the material of the negative lens GN, the axial-chromatic-aberration g-line is corrected in the plus direction, and the chromatic-aberration-of-magnification g-line is corrected in the plus direction. Accordingly, at least one of the diffractive optical element 101 (whose diffractive optical part has a positive refractive power) and the positive lens GP (formed of an extraordinary dispersion material), and the negative lens GN (formed of an extraordinary dispersion material) properly correct both secondary spectrum components of the axial chromatic aberration and chromatic aberration of magnification.

The paraxial marginal ray is an incident ray parallel to the light axis of the optical system with a height from the light axis defined as 1 when the focal length of the entire optical system is normalized to 1. The paraxial chief ray is a ray, among light incident upon the optical system at an angle of −45 degrees from the light axis, passing through an intersection of the light axis and an entrance pupil of the optical system, when the focal length of the entire optical system is normalized to 1. The incident angle of the optical system measured from the light axis in the clockwise direction is positive, and that measured from the light axis in the counterclockwise direction is negative. An object is assumed to exist on the left of the optical system, and the light ray incident upon the optical system from the object side is assumed to travel from left to right.

Next, the characteristics of the diffractive optical element will be described. The diffractive optical element has optical characteristics that differ from refraction by, for example, glass or plastic. That is, the diffractive optical element has negative dispersion and extraordinary dispersion characteristics. In each numerical example, in the diffractive optical element 101, the Abbe number νd=−3.45, and the partial dispersion ratio θgF=0.296. By making use of this optical nature, it is possible to properly correct chromatic aberrations of the photographing optical system.

The diffractive optical element used in the photographing optical system may be provided with an aspherical surface effect as a result of changing the pitch from its light-axis center to a peripheral portion.

The diffractive optical part in each of the first to third numerical examples is provided at a lens surface whose object side has a convex form. By this, the angle of incidence with respect to the diffractive optical part is made small for various light rays that travel towards the image plane of the photographing optical system, to increase the diffraction efficiency.

The diffractive optical element can be manufactured by a method of attaching an ultraviolet curable resin layer as the diffractive optical part to a lens surface (what is called a replica method). Since some types of ultraviolet curable resin have weak ultraviolet resistance, when ultraviolet curable resin is used in the optical system, it is desirable to dispose a lens coated with an ultraviolet-ray protective coating at the object side of the diffractive optical part.

Next, a method of producing the diffractive optical element will be described with reference to the first numerical example. The diffractive optical part according to the first numerical example is provided at a joint surface where the negative lens 15 of the first lens unit, disposed closest to the image side, and the positive lens 16, disposed at the image side of the negative lens 15, are joined to each other. First, of the lens surfaces of the negative lens 15 and the positive lens 16, reflection-prevention coatings are applied by vacuum evaporation or the like to the lens surfaces that are not subjected to replica processing. Next, using a replica molding diffraction grating mold (not shown) having a predetermined form, replica diffraction gratings are formed on the other surfaces of the negative lens 15 and the positive lens 16. Since the replica diffraction gratings are formed of ultraviolet curable resin material, the lenses are irradiated with ultraviolet light from the lens surfaces opposite to the replica mold diffraction grating mold during the molding. Therefore, it is desirable that a replica base glass material be a material having high ultraviolet light transmittance, and that coatings having high ultraviolet light transmittance be applied to the lens surfaces opposite to the replica molding surfaces. By increasing the ultraviolet-light transmittance, curing time of the resin can be reduced, so that it is possible to prevent improper curing of the resin and a reduction in surface precision of the diffraction gratings. In addition, for providing resistance to ultraviolet light, an ultraviolet-light blocking unit is provided, independently of the positive lens 16 and the negative lens 15, which are replica molding lenses. In a related photographing optical system, since an ultraviolet-light protecting unit is formed by a protective filter that substantially has no refractive power, the number of optical members is increased, thereby increasing the overall lens length. In the photographing optical system according to the first numerical example, of the lens closest to the object side, either the object-side lens surface or the image-side lens surface is coated with an ultraviolet-light protecting coating, thereby making it possible to reduce the overall lens length. It is desirable that the film serving as the ultraviolet-light protecting unit be a layered film that prevents reflection of a visible-light range.

Each of the numerical examples satisfy the following Conditions (3) to (5). Here, the focal length of the entire system is f, the length along the light axis from the lens surface of the optical system closest to the object side to the image plane is OTL, the focal length of the negative lens GN is fn, and the length along the light axis from the lens surface closest to the object side to the object-side surface of the negative lens GN is Ln.

$$0.4 < OTL/f < 0.65 \quad (3)$$

$$0.03 < |fn|/f < 0.3 \quad (4)$$

$$0.6 < Ln/OTL < 1 \quad (5)$$

Condition (3) expresses the ratio between the overall lens length OTL and the focal length f of the photographing optical system, and is an expression indicating the amount of reduction of the overall lens length. When OTL/f passes the lower limit of Condition (3), the overall lens length OTL of the photographing optical system is reduced. Therefore, various aberrations occurring at each lens unit are increased, thereby making it difficult to properly correct all of the aberrations. When the upper limit of Condition (3) is exceeded, the overall lens length OTL is increased, which is advantageous for correcting the aberrations. However, the overall lens length OTL is not reduced.

Condition (4) is for defining the focal length fn of the negative lens GN, which uses a material having extraordinary dispersion characteristics, with respect to the focal length f of the entire lens system. When |fn|/f passes the lower limit of Condition (4), the refractive power of the negative lens GN is increased. Therefore, chromatic aberration of magnification is excessively corrected, thereby reducing the optical performance. When the upper limit of Condition (4) is exceeded, the refractive power of the negative lens GN is reduced. Therefore, the chromatic aberration of magnification is corrected by a small amount, thereby making it difficult to sufficiently correct the chromatic aberration.

Condition (5) is for defining a length Ln, from the lens surface of the photographing optical system closest to the object side to the object-side lens surface of the negative lens GN, with respect to the overall lens length OTL of the photographing optical system. When Ln/OTL passes the lower limit of Condition (5), Ln is reduced. Therefore, the paraxial marginal light ray passing through the negative lens GN is high in height, but, in this direction, the paraxial chief ray becomes low in height. As a result, the ability to correct chromatic aberration of magnification is reduced, thereby reducing optical performance. When Ln is increased towards the upper limit of Condition (5), the paraxial marginal light ray passing through the negative lens GN is low in height, but, in this direction, the paraxial chief ray becomes high in height. As a result, the ability to correct chromatic aberration of magnification is increased, so that chromatic aberration of magnification can be easily corrected. However, in the numerical examples, since mounting to, for example, a single lens reflex camera and mounting of an attachment lens, such as an extender, are considered, the magnitude of the length Ln is restricted even by such physical factors.

In each of the first to third numerical examples, the diffractive optical element 101 is disposed to reduce the overall optical length and to reduce the weight of the lens system.

When a diffractive power of the diffractive optical element 101 (that is, optical power provided by only the diffractive optical part) is φd, and the length along the light axis from the lens surface of the photographing optical system closest to the object side to the diffractive surface of the diffractive optical element 101 is Ld, the following Conditions (6) and (7) are satisfied:

$$0.07 < \phi d \times f < 0.2 \quad (6)$$

$$0.3 < Ld/OTL < 0.65 \quad (7)$$

Figure 12:
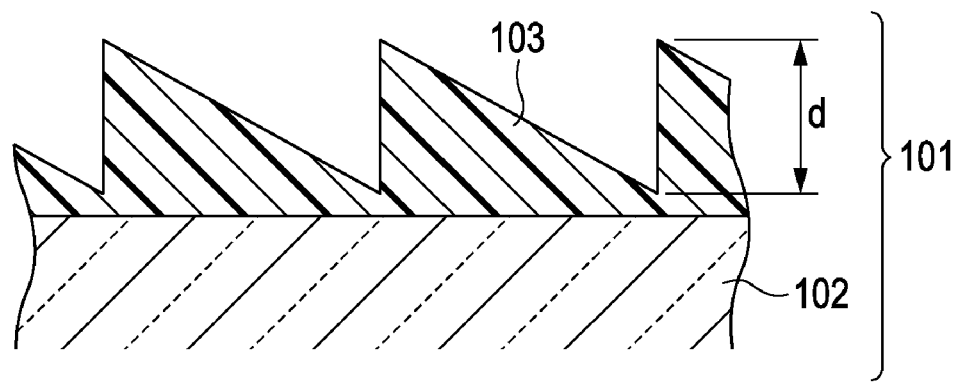
FIG. 12 illustrates another diffractive optical element according to the present invention.
Figure 14:
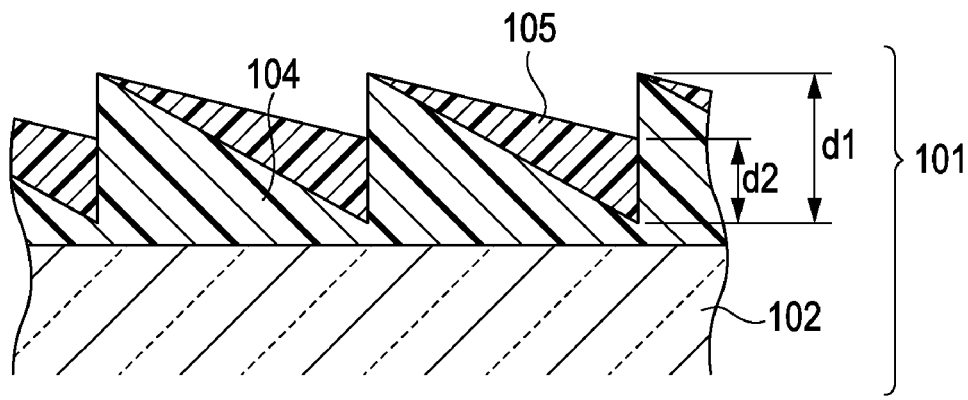
FIG. 14 illustrates still another diffractive optical element according to the present invention.

In single-layer diffractive optical elements shown in FIGS. 12 and 14, the diffractive surface of the diffractive optical element 101 is such that the length from the lens surface of the photographing optical system closest to the object side to the object side of a diffraction grating is Ld. In a layered diffractive optical element shown in FIG. 10, the length along the light axis from the lens surface of the photographing optical system closest to the object side to a middle point of facing diffraction gratings is Ld.

Condition (6) is for defining the diffractive power φd of the diffractive optical element with respect to the focal length of the entire system. When φd×f passes the lower limit of Condition (6), the positive diffractive power of the diffraction of the diffractive optical element becomes weaker. Therefore, the effect of correcting axial chromatic aberration and chromatic aberration of magnification is reduced, thereby reducing optical performance. When the upper limit of Condition (6) is exceeded, the positive diffractive power of the diffraction of the diffractive optical element is increased. Therefore, the effect of correcting axial chromatic aberration and chromatic aberration of magnification is increased. Consequently, chromatic aberration of magnification is properly corrected. However, in particular, axial chromatic aberration tends to be excessively corrected, that is, axial chromatic aberration for the g-line is increased in the minus direction, thereby reducing optical performance.

Condition (7) is for defining a ratio between the overall lens length OTL of the photographing optical system and the length Ld along the light axis from the lens surface of the first lens unit closest to the object side to the diffractive surface of the diffractive optical element. Primarily, Condition (7) is for, while properly correcting chromatic aberration, reducing the frequency with which undesired light not involved in a photographing operation strikes, for example, an edge of a diffractive grating, and produces flare. When Ld/OTL passes the lower limit of Condition (7), the length Ld along the light axis from the lens surface of the first lens unit B1 closest to the object side to the diffractive surface of the diffractive optical element becomes too small. Therefore, the effect of correcting aberrations by diffraction is increased, but the frequency with which flare occurs is increased. When the upper limit of Condition (7) is exceeded, the length Ld along the light axis from the lens surface of the first lens unit B1 closest to the object side to the diffractive surface of the diffractive optical element is increased. Therefore, flare occurs less frequently, but the effect of correcting aberrations by diffraction is reduced.

In the first to fourth numerical examples, when air intervals between the first positive lenses 11, 21, 31, and 41, disposed closest to the object side of the respective first lens units, and the second positive lenses 12, 22, 32, and 42, disposed at the image side of the respective first positive lenses 11, 21, 31, and 41, are each L1, and the focal length of each first positive lens is fg1, the following Conditions (8) and (9) are satisfied:

$$0.01 < L1/OTL < 0.2 \quad (8)$$

$$0.3 < fg1/f < 0.7 \quad (9)$$

Conditions (8) and (9) are for reducing the weight of the lenses.

Condition (8) is for defining ratios between the air intervals L1 (between the first positive lenses 11, 21, 31, and 41 of the respective first lens units, disposed closest to the object side, and the respective second positive lenses 12, 22, 32, and 42, disposed at the image side of the respective first positive lenses 11, 21, 31, and 41) and the entire length OTL of the photographing optical system. When L1/OTL passes the lower limit of Condition (8), the air interval L1 between the first positive lens of each first lens unit closest to the object side and the second positive lens disposed at the image side thereof is reduced. Therefore, the outside diameter of the lenses disposed closer to the image side than the corresponding second positive lens is increased, thereby increasing the weight of the lenses. When the upper limit of Condition (8) is exceeded, the air interval L1 between the first positive lens of each first lens unit closest to the object side and the second positive lens disposed at the image side thereof is increased. Therefore, various aberrations occurring at each first lens unit is increased, which is not desirable.

Condition (9) is for defining the focal lengths fg1 of the positive lenses 11, 21, 31, and 41 of the respective first lens units, disposed closest to the object side, with respect to the focal length f of the entire lens system. When fg1/f passes the lower limit of Condition (9), the positive refractive powers of the respective positive lenses 11, 21, 31, and 41 are increased. Therefore, the outside diameters of the lenses closer to the image side than the second positive lenses 12, 22, 32, and 42 of the respective first lens units are reduced, thereby reducing the weights of the lenses. However, aberrations occurring at the first positive lenses are increased, thereby making it difficult to correct the aberrations. When the upper limit of Condition (9) is exceeded, the refractive powers of the first positive lenses 11, 21, 31, and 41 are reduced. Therefore, the outside diameters of the lenses closer to the image side than the second positive lenses 12, 22, 32, and 42 are increased, thereby increasing the weights of the lenses.

In each of the first to fourth numerical examples, the photographing optical system includes, in order of lenses from the object side, the first lens unit B1 having a positive refractive power, the second lens unit B2 having a negative refractive power, and a third lens unit B3 having either a positive or a negative refractive power, and the second lens unit is moveable along the light axis to perform focusing. Accordingly, focusing is performed by the small, light second lens unit B2 to achieve good operability. In addition, when an auto focus camera is used, the load of an actuator for a focusing lens is small, so that driving of the lens can be quickly performed.

In each of the first to fourth numerical examples, the 32nd lens (unit B32 of the third lens unit B3) is moveable in a direction having a component perpendicular to the light axis, thereby correcting camera movement (stabilizing image). In addition, in each of the numerical examples, although an image is stabilized by one of the lens units of the third lens unit B3, the image may be stabilized by the entire third lens unit.

In the first numerical example, the first lens unit includes, in order of lenses from the object side, the positive lens 11, the positive lens 12, the positive lens 13, and the negative lens 14, with the positive lens 13 and the negative lens 14 constituting a cemented lens. The object-side lens surface of the negative lens 14 corrects spherical aberration occurring at the first lens unit. When the negative lens 14 is joined to the positive lens 13, the positive lens 13 and the negative lens 14 are prevented from moving relative to each other, thereby preventing a reduction in the optical performance of the entire system caused by an imbalance between the corrections of the aberrations.

Next, the diffractive optical part according to the present invention will be described in detail. The diffractive optical part may have a two-layer structure shown in FIG. 10 including diffraction gratings 106 and 107 separated by an air gap, or a one-layer structure shown in FIG. 12 including a diffractive grating 103 having a form shown in FIG. 12. In addition, the diffractive optical part may have a two-layer structure shown in FIG. 14 including two diffraction gratings 104 and 105 having different (or the same) thicknesses.

Figure 10:
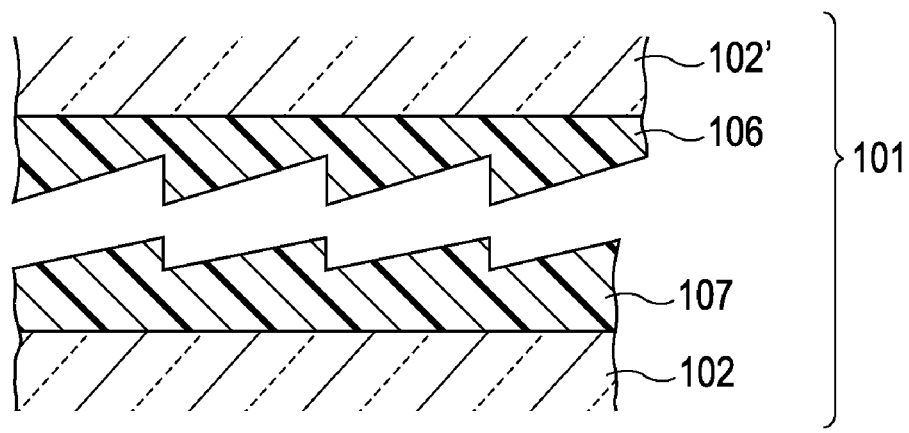
FIG. 10 illustrates a diffractive optical element according to the present invention.

In FIGS. 10, 12, and 14, reference numerals 102 and 102' denote substrates (bases).

Figure 11:
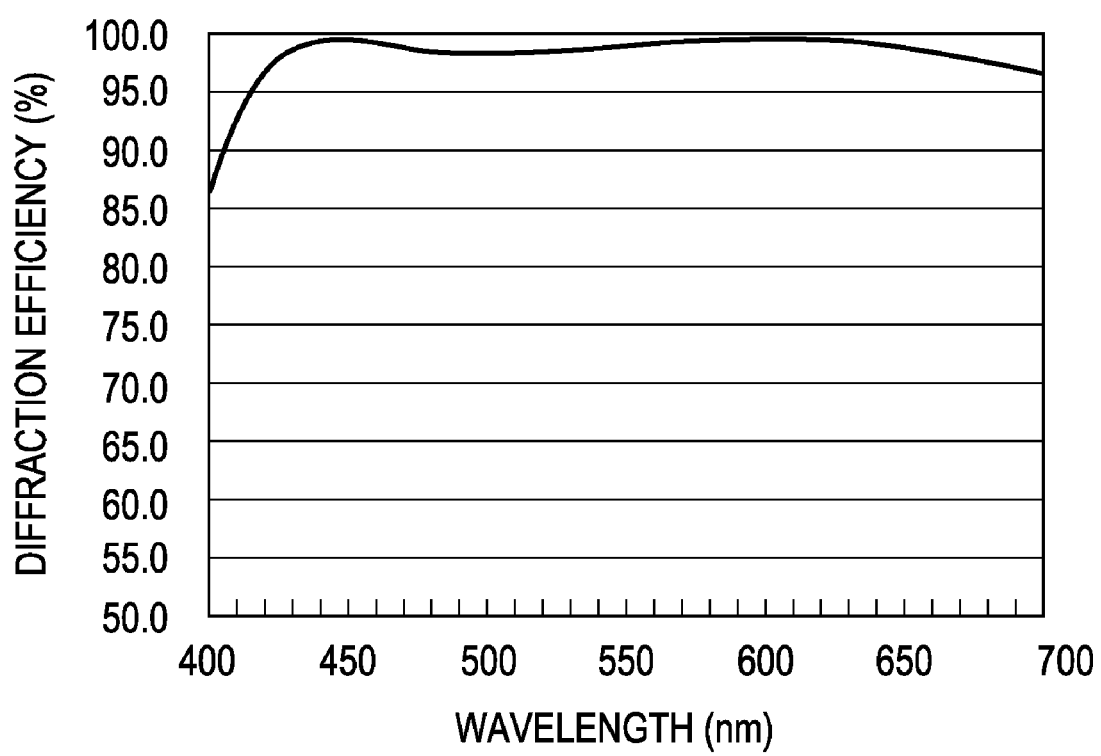
FIG. 11 illustrates how the efficiency of the diffractive optical element according to the present invention depends on wavelength.

In the diffractive optical element 101 shown in FIG. 10, the first diffraction grating 106, formed of ultraviolet curable resin, is formed on the base (lens or flat plate) 102, and the second diffraction grating 107, formed of ultraviolet curable resin, is formed on the base (lens or flat plate) 102'. FIG. 11 is a schematic diagram illustrating dependency of diffraction efficiency of first-order diffraction light on wavelength in the diffractive optical part using the two diffraction gratings 106 and 107 shown in FIG. 10. As can be understood from FIG. 11, the diffraction efficiency has a high value of at least 95% in the entire area of wavelengths used, as expected with this design which is optimized for first order diffraction.

Figure 13:
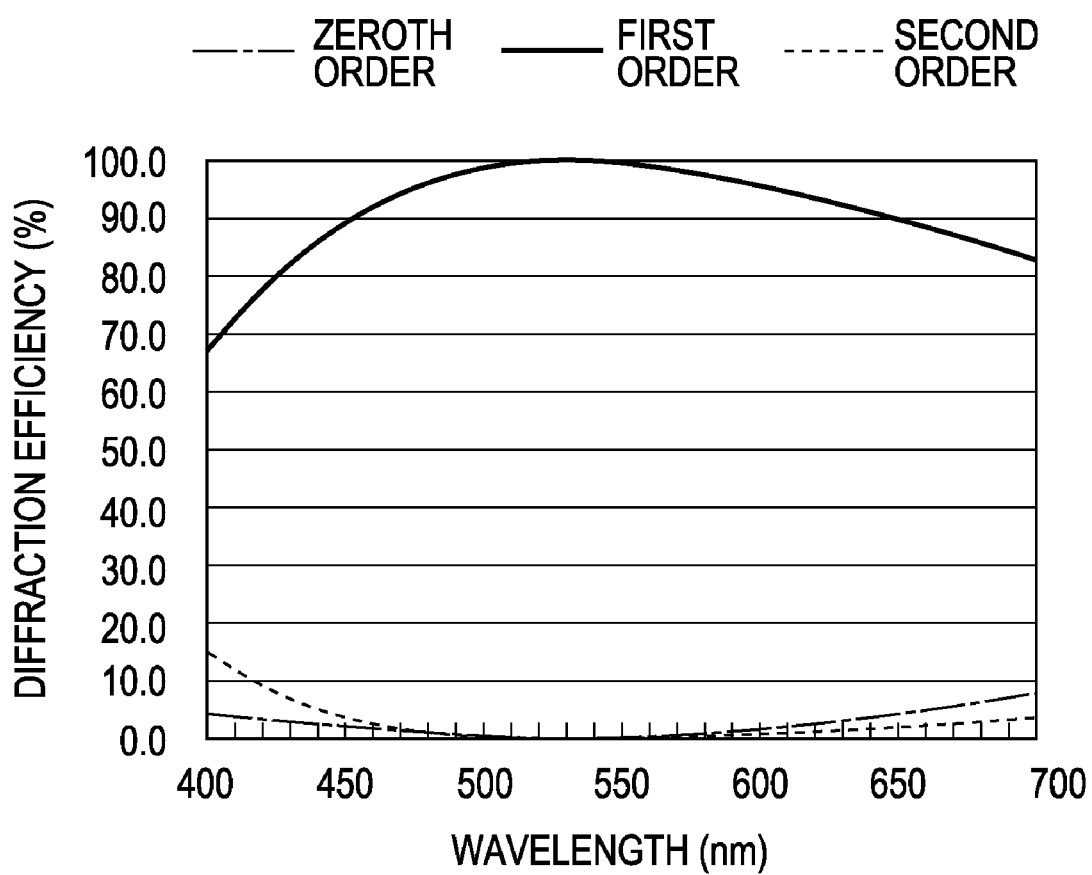
FIG. 13 illustrates how the efficiency of the diffractive optical element according to the present invention depends on wavelength.

FIG. 13 is a schematic diagram illustrating dependency of diffraction efficiency of a first-order diffraction light on wavelength in the one-layer diffractive optical part shown in FIG. 12. In the actual structure of the diffractive optical element, ultraviolet curable resin is applied to a surface of the base (glass) to form in the ultraviolet curable resin, the diffraction grating 103 having a grating thickness d so that the diffraction efficiency of the first-order diffraction light is 100% at a wavelength of 530 nm. As is clear from FIG. 13, the diffraction efficiency is reduced as it is set further away from the optimized wavelength of 530 nm, whereas the diffraction efficiency of a 0th order diffraction light and that of a 2nd order diffraction light are increased. An increase in diffraction lights of orders other than that of the design order results in flare, thereby reducing the resolution of the optical system.

Figure 15:
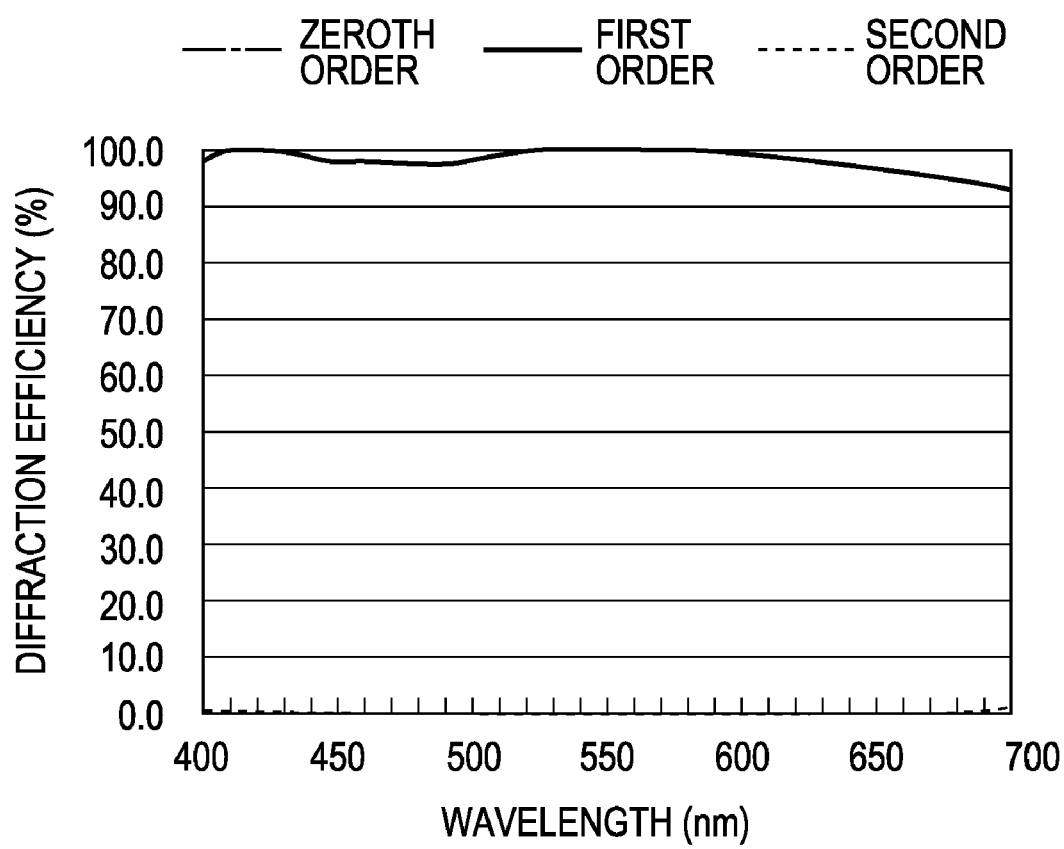
FIG. 15 illustrates how the efficiency of the diffractive optical element according to the present invention depends on wavelength.

FIG. 15 is a schematic view illustrating how the diffraction efficiency of 1st order diffraction light depends on wavelength in the laminated diffraction optical part shown in FIG. 14 including the two diffraction gratings 104 and 105 laminated to each other. In the diffractive optical element 101 shown in FIG. 14, the first diffraction grating 104, formed of ultraviolet curable resin (nd=1.499 and vd=54), is formed on the base 102, and the second diffraction grating 105, formed of ultraviolet curable resin (nd=1.598 and vd=28), is formed on the first diffraction grating 104. In the combination of these materials, a grating thickness d1 of the first diffraction grating 104 is 13.8 μm, and a grating thickness d2 of the second diffraction grating 105 is 10.5 μm. As can be understood from FIG. 15, when the diffractive optical part has a laminated structure, the diffraction efficiency for the design order (first order) has a high value of at least 95% in the entire area of wavelengths used.

Next, the numerical examples according to the present invention will be described in more detail. In each numerical example, the order of a surface from the object side is i, ri represents the curvature radius of the ith surface, di represents the distance between the ith surface and the (i+1)th surface, and ni and vi represent the refractive index of a d-line of the material of the ith surface, and Abbe number, respectively.

In the diffractive optical part, when a reference wavelength (d-line) is $\lambda o$, the distance from the light axis is (h), and the phase is $\Phi(h)$, the following formula is satisfied:

$$\Phi(h) = 2\pi\lambda o(C1 \cdot h^2 + C2 \cdot h^4 + C3 \cdot h^6 + \ldots)$$

f represents a focal length, FNo represents an F number, and ω represents a half angle of view. BF represents back focus. In each numerical example, the last two surfaces that do not have refractive power are glass block surfaces used in terms of design. The relationships between the aforementioned conditions and the numerical examples are given in Table 1.

FIRST NUMERICAL EXAMPLE

| f = 779.9 FNo = 1:5.8 2ω = 3.2° | | | |
|---|---|---|---|
| r1 = 203.877 | d1 = 15.34 | n1 = 1.48749 | v1 = 70.2 |
| r2 = −3707.288 | d2 = 38.61 | | |
| r3 = 196.432 | d3 = 12.01 | n2 = 1.43387 | v2 = 95.1 |
| r4 = 12057.913 | d4 = 11.35 | | |
| r5 = 168.599 | d5 = 13.41 | n3 = 1.48749 | v3 = 70.2 |
| r6 = −485.956 | d6 = 5.00 | n4 = 1.81600 | v4 = 46.6 |
| r7 = 210.730 | d7 = 90.24 | | |
| r8 = 92.567 | d8 = 2.50 | n5 = 1.72916 | v5 = 54.7 |
| r9 = 50.030 (DIFFRACTIVE SURFACE) | d9 = 8.68 | n6 = 1.51633 | v6 = 64.1 |
| r10 = 110.875 | d10 = 31.03 | | |
| r11 = −1979.327 | d11 = 1.80 | n7 = 1.74077 | v7 = 27.8 |
| r12 = −211.093 | d12 = 2.00 | n8 = 1.83400 | v8 = 37.2 |
| r13 = 103.557 | d13 = 44.43 | | |
| r14 = ∞ (APERTURE) | d14 = 12.55 | | |
| r15 = 102.145 | d15 = 1.40 | n9 = 1.84666 | v9 = 23.9 |
| r16 = 27.241 | d16 = 6.26 | n10 = 1.58144 | v10 = 40.8 |
| r17 = −85.610 | d17 = 1.57 | | |
| r18 = −1056.605 | d18 = 4.66 | n11 = 1.74950 | v11 = 35.3 |
| r19 = −30.913 | d19 = 1.10 | n12 = 1.72916 | v12 = 54.7 |
| r20 = 52.450 | d20 = 2.51 | | |
| r21 = −68.136 | d21 = 1.10 | n13 = 1.80400 | v13 = 46.6 |
| r22 = −119.732 | d22 = 3.57 | | |
| r23 = 82.918 | d23 = 5.59 | n14 = 1.74950 | v14 = 35.3 |
| r24 = −55.275 | d24 = 1.10 | n15 = 1.80400 | v15 = 46.6 |
| r25 = −295.449 | d25 = 1.40 | | |
| r26 = 207.832 | d26 = 7.03 | n16 = 1.51633 | v16 = 64.1 |
| r27 = −25.646 | d27 = 1.90 | n17 = 1.43875 | v17 = 95.0 |
| r28 = 182.444 | d28 = 3.12 | | |
| r29 = ∞ | d29 = 2.65 | n18 = 1.51633 | v18 = 64.1 |
| r30 = ∞ | BF = 128.09 | | |

Phase Coefficient

| | C2 | C4 | C6 |
|---|---|---|---|
| 9TH SURFACE | −9.2E−05 | −1.37239E−08 | −4.82667E−12 |

Refractive Indices of Material in First Numerical Example

| | d | g | c | f |
|---|---|---|---|---|
| G1 | 1.487490 | 1.495964 | 1.485344 | 1.492285 |
| G2 | 1.433870 | 1.439490 | 1.432480 | 1.437040 |
| G3 | 1.487490 | 1.495964 | 1.485344 | 1.492285 |
| G4 | 1.816000 | 1.837997 | 1.810749 | 1.828252 |
| G5 | 1.729157 | 1.745696 | 1.725101 | 1.738436 |
| G6 | 1.516330 | 1.526214 | 1.513855 | 1.521905 |
| G7 | 1.740769 | 1.775994 | 1.733089 | 1.759746 |
| G8 | 1.834000 | 1.862781 | 1.827376 | 1.849819 |
| G9 | 1.846660 | 1.893856 | 1.836554 | 1.871929 |
| G10 | 1.581439 | 1.599726 | 1.577216 | 1.591486 |
| G11 | 1.749500 | 1.776810 | 1.743260 | 1.764470 |
| G12 | 1.729157 | 1.745696 | 1.725101 | 1.738436 |
| G13 | 1.804000 | 1.825699 | 1.798815 | 1.816080 |
| G14 | 1.749500 | 1.776810 | 1.743260 | 1.764470 |
| G15 | 1.804000 | 1.825699 | 1.798815 | 1.816080 |
| G16 | 1.516330 | 1.526214 | 1.513855 | 1.521905 |
| G17 | 1.438750 | 1.444420 | 1.437334 | 1.441953 |
| G18 | 1.516330 | 1.526214 | 1.513855 | 1.521905 |

SECOND NUMERICAL EXAMPLE

| f = 779.9 FNo = 1:5.8 2ω = 3.2° | | | |
|---|---|---|---|
| r1 = 186.364 | d1 = 19.97 | n1 = 1.48749 | v1 = 70.2 |
| r2 = −595.858 | d2 = 43.01 | | |
| r3 = 137.154 | d3 = 13.78 | n2 = 1.48749 | v2 = 70.2 |
| r4 = 19591.727 | d4 = 2.53 | | |
| r5 = −584.589 | d5 = 4.80 | n3 = 1.83481 | v3 = 42.7 |
| r6 = 195.797 | d6 = 67.88 | | |
| r7 = 80.110 | d7 = 5.79 | n4 = 1.48749 | v4 = 70.2 |
| r8 = 122.602 (DIFFRACTIVE SURFACE) | d8 = 6.11 | n5 = 1.48749 | v5 = 70.2 |
| r9 = 334.254 | d9 = 0.49 | | |
| r10 = 74.122 | d10 = 5.50 | n6 = 1.69680 | v6 = 55.5 |
| r11 = 53.195 | d11 = 71.41 | | |
| r12 = 2210.938 | d12 = 3.50 | n7 = 1.43387 | v7 = 95.1 |
| r13 = 65.125 | d13 = 40.63 | | |
| r14 = ∞ (APERTURE) | d14 = 4.88 | | |
| r15 = 228.523 | d15 = 1.40 | n8 = 1.84666 | v8 = 23.9 |
| r16 = 38.815 | d16 = 4.89 | n9 = 1.51742 | v9 = 52.4 |
| r17 = −68.001 | d17 = 0.50 | | |
| r18 = 88.845 | d18 = 4.42 | n10 = 1.74950 | v10 = 35.3 |
| r19 = −37.640 | d19 = 1.10 | n11 = 1.72916 | v11 = 54.7 |
| r20 = 55.336 | d20 = 1.81 | | |
| r21 = −68.115 | d21 = 1.10 | n12 = 1.83481 | v12 = 42.7 |
| r22 = 161.233 | d22 = 1.87 | | |

-continued

| f = 779.9 FNo = 1:5.8 2ω = 3.2° | | | |
|---|---|---|---|
| r23 = 87.482 | d23 = 5.23 | n13 = 1.63980 | v13 = 34.5 |
| r24 = −33.620 | d24 = 1.10 | n14 = 1.71300 | v14 = 53.9 |
| r25 = −111.334 | d25 = 53.07 | | |
| r26 = 324.874 | d26 = 6.28 | n15 = 1.51633 | v15 = 64.1 |
| r27 = −46.875 | d27 = 1.97 | n16 = 1.43387 | v16 = 95.1 |
| r28 = −365.005 | d28 = 4.79 | | |
| r29 = ∞ | d29 = 2.65 | n17 = 1.51633 | v17 = 64.1 |
| r30 = ∞ | BF = 79.58 | | |

Phase Coefficient

| | C2 | C4 | C6 |
|---|---|---|---|
| 8TH SURFACE | −5.40324E−05 | −1.02025E−09 | −7.78836E−14 |

Refractive Indices of Material in Second Numerical Example

| | d | g | c | f |
|---|---|---|---|---|
| G1 | 1.487490 | 1.495964 | 1.485344 | 1.492285 |
| G2 | 1.487490 | 1.495964 | 1.485344 | 1.492285 |
| G3 | 1.834807 | 1.859527 | 1.828974 | 1.848514 |
| G4 | 1.487490 | 1.495964 | 1.485344 | 1.492285 |
| G5 | 1.487490 | 1.495964 | 1.485344 | 1.492285 |
| G6 | 1.696797 | 1.712339 | 1.692974 | 1.705522 |
| G7 | 1.433870 | 1.439490 | 1.432480 | 1.437040 |
| G8 | 1.846660 | 1.893856 | 1.836554 | 1.871929 |
| G9 | 1.517417 | 1.529804 | 1.514444 | 1.524313 |
| G10 | 1.749500 | 1.776810 | 1.743260 | 1.764470 |
| G11 | 1.729157 | 1.745696 | 1.725101 | 1.738436 |
| G12 | 1.834807 | 1.859527 | 1.828974 | 1.848514 |
| G13 | 1.639799 | 1.663933 | 1.634375 | 1.652939 |
| G14 | 1.712995 | 1.729435 | 1.708974 | 1.722210 |
| G15 | 1.516330 | 1.526214 | 1.513855 | 1.521905 |
| G16 | 1.433870 | 1.439490 | 1.432480 | 1.437040 |
| G17 | 1.516330 | 1.526214 | 1.513855 | 1.521905 |

THIRD NUMERICAL EXAMPLE

| f = 780.0 FNo = 1:5.8 2ω = 3.2° | | | |
|---|---|---|---|
| r1 = 194.182 | d1 = 15.05 | n1 = 1.48749 | v1 = 70.2 |
| r2 = 10616.340 | d2 = 40.71 | | |
| r3 = 220.847 | d3 = 12.39 | n2 = 1.43387 | v2 = 95.1 |
| r4 = −1636.846 | d4 = 8.84 | | |
| r5 = 170.197 | d5 = 14.34 | n3 = 1.48749 | v3 = 70.2 |
| r6 = −393.063 | d6 = 1.00 | | |
| r7 = −372.757 | d7 = 5.00 | n4 = 1.81600 | v4 = 46.6 |
| r8 = 219.672 | d8 = 90.49 | | |
| r9 = 64.525 | d9 = 2.50 | n5 = 1.72916 | v5 = 54.7 |
| r10 = 45.996 (ASPHERICAL SURFACE) | d10 = 6.92 | n6 = 1.48749 | v6 = 70.2 |
| r11 = 65.443 | d11 = 33.53 | | |
| r12 = 1597.946 | d12 = 2.12 | n7 = 1.84666 | v7 = 23.9 |
| r13 = −410.398 | d13 = 2.00 | n8 = 1.83400 | v8 = 37.2 |
| r14 = 99.023 | d14 = 38.41 | | |
| r15 = ∞ (APERTURE) | d15 = 10.80 | | |
| r16 = 734.337 | d16 = 1.40 | n9 = 1.80518 | v9 = 25.4 |
| r17 = 23.481 | d17 = 7.49 | n10 = 1.58144 | v10 = 40.8 |
| r18 = −45.662 | d18 = 0.71 | | |
| r19 = −75.203 | d19 = 5.05 | n11 = 1.74950 | v11 = 35.3 |

-continued

| f = 780.0 FNo = 1:5.8 2ω = 3.2° | | | |
|---|---|---|---|
| r20 = −20.788 | d20 = 1.10 | n12 = 1.72916 | v12 = 54.7 |
| r21 = 164.130 | d21 = 2.70 | | |
| r22 = −36.703 | d22 = 1.10 | n13 = 1.83481 | v13 = 42.7 |
| r23 = −46.341 | d23 = 0.81 | | |
| r24 = 178.959 | d24 = 5.02 | n14 = 1.63980 | v14 = 34.5 |
| r25 = −48.935 | d25 = 1.10 | n15 = 1.71300 | v15 = 53.9 |
| r26 = −96.363 | d26 = 0.06 | | |
| r27 = 77.175 | d27 = 8.40 | n16 = 1.51633 | v16 = 64.1 |
| r28 = −24.197 | d28 = 2.00 | n17 = 1.43875 | v17 = 95.0 |
| r29 = 67.114 | d29 = 10.26 | | |
| r30 = ∞ | d30 = 2.65 | n18 = 1.51633 | v18 = 64.1 |
| r31 = ∞ | BF = 127.25 | | |

Phase Coefficient

| | C2 | C4 | C6 |
|---|---|---|---|
| 10TH SURFACE | −9.2E−05 | −1.69277E−08 | −1.04088E−11 |

Refractive Indices of Material in Third Numerical Example

| | d | g | c | f |
|---|---|---|---|---|
| G1 | 1.487490 | 1.495964 | 1.485344 | 1.492285 |
| G2 | 1.433870 | 1.439490 | 1.432480 | 1.437040 |
| G3 | 1.487490 | 1.495964 | 1.485344 | 1.492285 |
| G4 | 1.816000 | 1.837997 | 1.810749 | 1.828252 |
| G5 | 1.729157 | 1.745696 | 1.725101 | 1.738436 |
| G6 | 1.487490 | 1.495964 | 1.485344 | 1.492285 |
| G7 | 1.846660 | 1.893856 | 1.836554 | 1.871929 |
| G8 | 1.834000 | 1.862781 | 1.827376 | 1.849819 |
| G9 | 1.805181 | 1.847285 | 1.796106 | 1.827775 |
| G10 | 1.581439 | 1.599726 | 1.577216 | 1.591486 |
| G11 | 1.749500 | 1.776810 | 1.743260 | 1.764470 |
| G12 | 1.729157 | 1.745696 | 1.725101 | 1.738436 |
| G13 | 1.834807 | 1.859527 | 1.828974 | 1.848514 |
| G14 | 1.639799 | 1.663933 | 1.634375 | 1.652939 |
| G15 | 1.712995 | 1.729435 | 1.708974 | 1.722210 |
| G16 | 1.516330 | 1.526214 | 1.513855 | 1.521905 |
| G17 | 1.438750 | 1.444420 | 1.437334 | 1.441953 |
| G18 | 1.516330 | 1.526214 | 1.513855 | 1.521905 |

FOURTH NUMERICAL EXAMPLE

| f = 779.9 FNo = 1:5.8 2ω = 3.2° | | | |
|---|---|---|---|
| r1 = ∞ | d1 = 6.00 | n1 = 1.51633 | v1 = 64.1 |
| r2 = ∞ | d2 = 1.50 | | |
| r3 = 202.538 | d3 = 17.54 | n2 = 1.43387 | v2 = 95.1 |
| r4 = −704.267 | d4 = 17.33 | | |
| r5 = 149.890 | d5 = 15.83 | n3 = 1.43387 | v3 = 95.1 |
| r6 = 4124.923 | d6 = 8.00 | | |
| r7 = −1173.087 | d7 = 4.80 | n4 = 1.81600 | v4 = 46.6 |
| r8 = 378.882 | d8 = 49.40 | | |
| r9 = 69.074 | d9 = 12.07 | n5 = 1.43387 | v5 = 95.1 |
| r10 = 161.842 | d10 = 0.15 | | |
| r11 = 84.635 | d11 = 5.50 | n6 = 1.69680 | v6 = 55.5 |
| r12 = 54.469 | d12 = 93.13 | | |
| r13 = 330.881 | d13 = 2.60 | n7 = 1.84666 | v7 = 23.9 |
| r14 = −121.723 | d14 = 1.98 | n8 = 1.83400 | v8 = 37.2 |
| r15 = 71.949 | d15 = 31.99 | | |
| r16 = ∞ (APERTURE) | d16 = 12.00 | | |

-continued f = 779.9 FNo = 1:5.8 2ω = 3.2°

| r17 = 83.527 | d17 = 1.40 | n9 = 1.84666 | v9 = 23.9 |
| r18 = 42.483 | d18 = 5.30 | n10 = 1.51742 | v10 = 52.4 |
| r19 = −98.440 | d19 = 1.93 | | |
| r20 = 123.042 | d20 = 3.87 | n11 = 1.74950 | v11 = 35.3 |
| r21 = −63.148 | d21 = 1.10 | n12 = 1.72916 | v12 = 54.7 |
| r22 = 84.430 | d22 = 2.03 | | |
| r23 = −84.492 | d23 = 1.10 | n13 = 1.83481 | v13 = 42.7 |
| r24 = 117.356 | d24 = 1.75 | | |
| r25 = 135.240 | d25 = 3.80 | n14 = 1.63980 | v14 = 34.5 |
| r26 = −120.129 | d26 = 1.10 | n15 = 1.71300 | v15 = 53.9 |
| r27 = −275.296 | d27 = 26.41 | | |
| r28 = 180.067 | d28 = 7.11 | n16 = 1.51633 | v16 = 64.1 |
| r29 = −37.420 | d29 = 1.00 | n17 = 1.43875 | v17 = 95.0 |
| r30 = −1396.987 | d30 = 9.93 | | |
| r31 = ∞ | d31 = 2.65 | n18 = 1.51633 | v18 = 64.1 |
| r32 = ∞ | BF = 119.29 | | |

Refractive Indices of Material in Fourth Numerical Example

| | d | g | c | f |
|---|---|---|---|---|
| G1 | 1.516330 | 1.526214 | 1.513855 | 1.521905 |
| G2 | 1.433870 | 1.439490 | 1.432480 | 1.437040 |
| G3 | 1.433870 | 1.439490 | 1.432480 | 1.437040 |
| G4 | 1.816000 | 1.837997 | 1.810749 | 1.828252 |
| G5 | 1.433870 | 1.439490 | 1.432480 | 1.437040 |
| G6 | 1.696797 | 1.712339 | 1.692974 | 1.705522 |
| G7 | 1.846660 | 1.893856 | 1.836554 | 1.871929 |
| G8 | 1.834000 | 1.862781 | 1.827376 | 1.849819 |
| G9 | 1.846660 | 1.893856 | 1.836554 | 1.871929 |
| G10 | 1.517417 | 1.529804 | 1.514444 | 1.524313 |
| G11 | 1.749500 | 1.776810 | 1.743260 | 1.764470 |
| G12 | 1.729157 | 1.745696 | 1.725101 | 1.738436 |
| G13 | 1.834807 | 1.859527 | 1.828974 | 1.848514 |
| G14 | 1.639799 | 1.663933 | 1.634375 | 1.652939 |
| G15 | 1.712995 | 1.729435 | 1.708974 | 1.722210 |
| G16 | 1.516330 | 1.526214 | 1.513855 | 1.521905 |
| G17 | 1.438750 | 1.444420 | 1.437334 | 1.441953 |
| G18 | 1.516330 | 1.526214 | 1.513855 | 1.521905 |

TABLE 1

| CONDITION | LOWER LIMIT | UPPER LIMIT | FIRST EMBODIMENT | SECOND EMBODIMENT | THRID EMBODIMENT | FOURTH EMBODIMENT |
|---|---|---|---|---|---|---|
| 1 LEFT SIDE: −0.0015 × vd + 0.6425 | — | — | 0.50 | 0.50 | 0.50 | 0.50 |
| RIGHT SIDE: θgF | — | — | 0.53 | 0.54 | 0.53 | 0.53 |
| 2  60 < vd | 60 | — | 95 | 95 | 95 | 95 |
| 3  OTL/f | 0.4 | 0.65 | 0.59 | 0.59 | 0.59 | 0.60 |
| 4  \|fn\|/f | 0.03 | 0.3 | 0.07 | 0.16 | 0.05 | 0.11 |
| 5  Ln/OTL | 0.6 | 0.9 | 0.71 | 0.81 | 0.69 | 0.72 |
| 6  φd × f | 0.07 | 0.2 | 0.14 | 0.08 | 0.14 | *** |
| 7  LD/OTL | 0.01 | 0.5 | 0.41 | 0.34 | 0.41 | *** |
| 8  L1/OTL | 0.01 | 0.2 | 0.08 | 0.09 | 0.09 | 0.04 |
| 9  Fg1/f | 0.3 | 0.7 | 0.51 | 0.38 | 0.52 | 0.47 |

Figure 16:
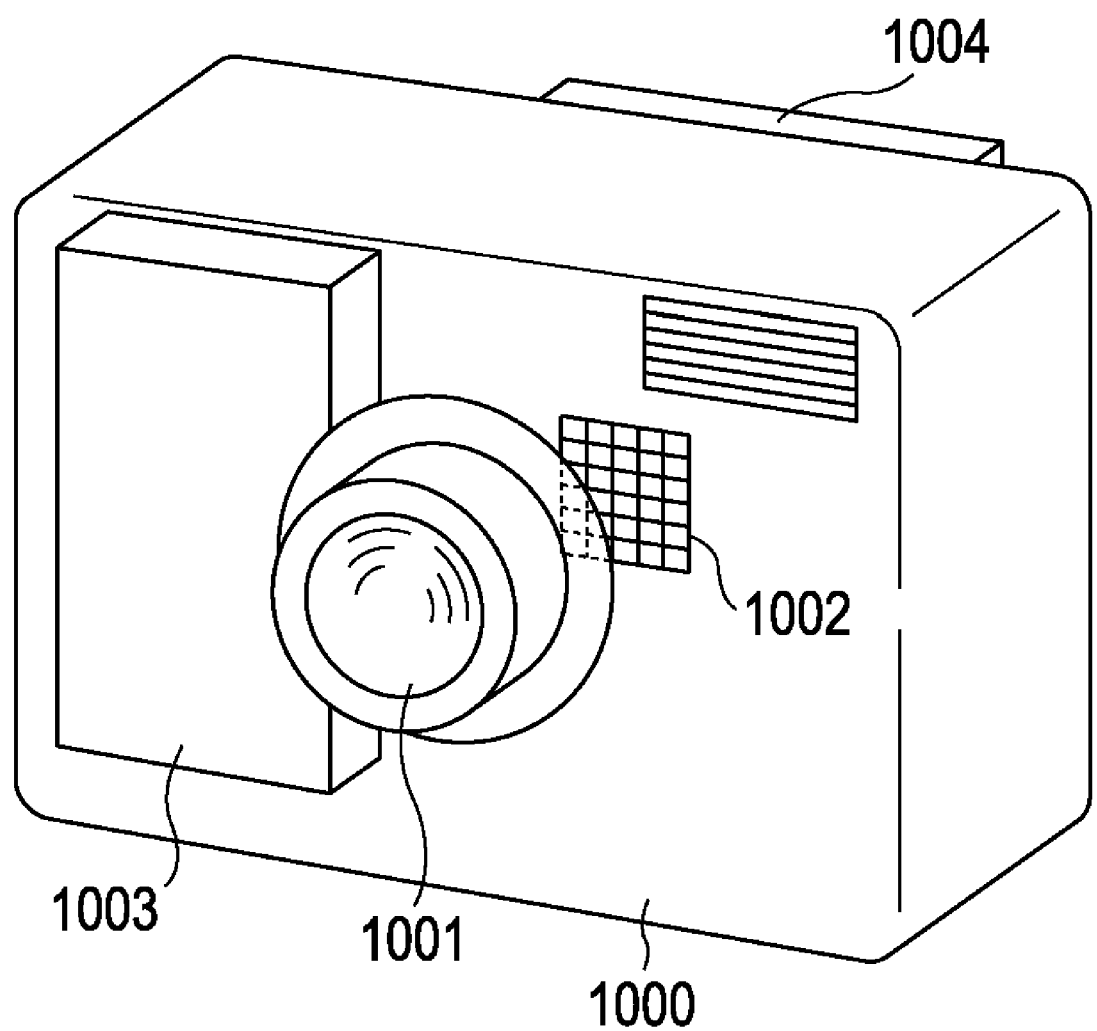
FIG. 16 is a schematic view of an image pickup apparatus according to the present invention.

Next, a digital camera (image pickup apparatus) using a photographing optical system according to the present invention will be described with reference to FIG. 16. In FIG. 16, reference numeral 1000 denotes a digital camera body. Reference numeral 1001 denotes a photographing optical system. Reference numeral 1002 denotes a solid-state image pickup element (photoelectric conversion element), such as a CCD sensor, which receives an object image through the photographing optical system 1001. Reference numeral 1003 denotes a memory that records information corresponding to the object image received by the image pickup element 1002. Reference numeral 1004 denotes a finder for observing the object image displayed on a display element (not shown). The display element includes, for example, a liquid crystal panel, and displays the object image formed on the image pickup element 1002. Accordingly, an image pickup apparatus including a telephoto-type photographing optical system having a short overall lens length and having chromatic aberration properly corrected is realized as a result of applying the photographing optical system according to the present invention to the image pickup apparatus, such as a digital camera.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-277725 filed Oct. 11, 2006, which is hereby incorporated by reference herein in its entirety.

What is claimed is:

1. A photographing optical system comprising:
   a positive lens provided closer to the object side of the system than the intersection (P) of the light axis and a paraxial chief ray; and
   a negative lens provided closer to the image side of the system than the intersection (P),
   wherein the positive lens and the negative lens are both formed of materials satisfying the following two conditions when the maximum height of a paraxial marginal ray, passing through a lens surface, from the light axis at a location closer to the object side than the intersection (P) is greater than a maximum height of the paraxial marginal ray, passing through a lens surface, from the light axis at a location closer to the image side than the intersection (P):

$-0.0015 \times vd + 0.6425 < \theta gF$, and $60 < vd$ where vd is the Abbe number and θgF is the partial dispersion ratio.

2. The photographing optical system according to claim 1, wherein the following condition is satisfied:

$0.4 < OTL/f < 0.65$ where f is the focal length of the photographing optical system, and OTL is a length along the light axis from a lens surface of the photographing optical system closest to the object side to the image plane.

3. The photographing optical system according to claim 1, wherein the negative lens satisfies the following conditions:

$$0.03 < |fn|/f < 0.3, \text{ and}$$

$$0.6 < Ln/OTL < 1$$

where fn is the focal length of the negative lens, and Ln is the length along the light axis from the lens surface closest to the object side to the object-side lens surface of the negative lens,.

4. The photographing optical system according to claim 1, further comprising a first positive lens, disposed closest to the object side, and a second positive lens, which is a second lens from the object side, wherein the following condition is satisfied:

$$0.01 < L1/OTL < 0.2$$

where L1 is the distance between the first positive lens and the second positive lens, and OTL is the length along the light axis from the lens surface of the photographing optical system closest to the object side to the image plane.

5. The photographing optical system according to claim 4, wherein the following condition is satisfied:

$$0.3 < fg1/f < 0.7$$

where fg1 is the focal length of the first positive lens, and f is the focal length of the photographing optical system.

6. The photographing optical system according to claim 1, comprising, in order of lens units from the object side, a first lens unit having a positive refractive power, a second lens unit having a negative refractive power, and a third lens unit having a positive refractive power or a negative refractive power, wherein the second lens unit is moveable along the light axis to perform focusing.

7. The photographing optical system according to claim 6, wherein at least a portion of the third lens unit is moveable in a direction having a component perpendicular to the light axis, so that an image, which is formed by the photographing optical system, is capable of being displaced perpendicular to the light axis.

8. The photographing optical system according to claim 1, comprising, in order of lenses from the object side, a positive lens, a positive lens, a positive lens, and a negative lens.

9. The photographing system according to claim 8, wherein the positive lens and the negative lens that are adjacent to each other are fixed to each other.

10. The photographing system according to claim 9, wherein the positive lens and the negative lens that are adjacent to each other are cemented to each other.

11. An image pickup apparatus comprising:
the photographing optical system of claim 1; and
a photoelectric conversion element that receives an image formed by the photographing optical system.

12. A photographing optical system comprising:
a positive lens provided closer to the object side of the system than an aperture; and
a negative lens provided closer to the image side of the system than the aperture,
wherein the positive lens and the negative lens are both formed of materials satisfying the following two conditions when the maximum height of a paraxial marginal ray, passing through a lens surface, from the light axis at a location closer to the object side than the aperture is greater than a maximum height of the paraxial marginal ray, passing through a lens surface, from the light axis at a location closer to the image side than the aperture:

$$-0.0015 \times vd + 0.6425 < \theta gF, \text{ and}$$

$$60 < vd$$

where vd is the Abbe number and θgF is the partial dispersion ratio.

13. An image pickup apparatus comprising:
the photographing optical system of claim 12; and
a photoelectric conversion element that receives an image formed by the photographing optical system.

14. A photographing optical system comprising:
a diffractive optical element provided closer to the object side of the system than the intersection (P) of the light axis and a paraxial chief ray; and
a negative lens provided closer to the image side of the system than the intersection (P),
wherein the negative lens is formed of a material satisfying the following two conditions when the maximum height of a paraxial marginal ray, passing through a lens surface, from the light axis at a location closer to the object side than the intersection (P) is greater than a maximum height of the paraxial marginal ray, passing through a lens surface, from the light axis at a location closer to the image side than the intersection (P):

$$-0.0015 \times vd = 0.6425 < \theta gF, \text{ and}$$

$$60 < vd$$

where vd is the Abbe number and θgF is the partial dispersion ratio.

15. The photographing optical system according to claim 14, wherein the following condition is satisfied:

$$0.4 < OTL/f < 0.65$$

where f is the focal length of the photographing optical system, and OTL is a length along the light axis from a lens surface of the photographing optical system closest to the object side to the image plane.

16. The photographing optical system according to claim 14, wherein the negative lens satisfies the following conditions:

$$0.03 < |fn|/f < 0.3, \text{and}$$

$$0.6 < Ln/OTL < 1$$

where fn is the focal length of the negative lens, f is the focal length of the photographing optical system, Ln is the length along the light axis from the lens surface closest to the object side to the object-side lens surface of the negative lens, and OTL is a length along the light axis from a lens surface of the photographing optical system closest to the object side to the image plane.

17. The photographing optical system according to claim 14, wherein the diffractive optical element satisfies the following conditions:

$$0.07 < \phi d \times f < 0.2, \text{ and}$$

$$0.3 < Ld/OTL < 0.65$$

where φd is the diffractive power of the diffractive optical element, f is the focal length of the photographing optical system, Ld is the length along the light axis from the lens surface closest to the object side to the diffractive surface of the diffractive optical element, and OTL is the length along the light axis from the lens surface of the photographing optical system closest to the object side to the image plane.

18. The photographing optical system according to claim 14, further comprising a first positive lens, disposed closest to the object side, and a second positive lens, which is a second lens from the object side, wherein the following condition is satisfied:

$$0.01 < L1/OTL < 0.2$$

where L1 is the distance between the first positive lens and the second positive lens, and OTL is the length along the light axis from the lens surface of the photographing optical system closest to the object side to the image plane.

19. The photographing optical system according to claim 14, wherein the following condition is satisfied:

$$0.3 < fg1/f < 0.7$$

where fg1 is the focal length of the first positive lens, and f is the focal length of the photographing optical system.

20. The photographing optical system according to claim 14, comprising, in order of lens units from the object side, a first lens unit having a positive refractive power, a second lens unit having a negative refractive power, and a third lens unit having a positive refractive power or a negative refractive power, wherein the second lens unit is moveable along the light axis to perform focusing.

21. The photographing optical system according to claim 20, wherein at least a portion of the third lens unit is moveable in a direction having a component perpendicular to the light axis, so that an image, which is formed by the photographing optical system, is capable of being displaced perpendicular to the light axis.

22. The photographing optical system according to claim 14, comprising, in order of lenses from the object side, a positive lens, a positive lens, a positive lens, and a negative lens.

23. The photographing system according to claim 22, wherein the positive lens and the negative lens that are adjacent to each other are fixed to each other.

24. The photographing system according to claim 23, wherein the positive lens and the negative lens that are adjacent to each other are cemented to each other.

25. An image pickup apparatus comprising:
the photographing optical system of claim 14; and
a photoelectric conversion element that receives an image formed by the photographing optical system.

26. A photographing optical system comprising:
a diffractive optical element provided closer to the object side of the system than an aperture; and
a negative lens provided closer to the image side of the system than the aperture,
wherein the negative lens is formed of a material satisfying the following two conditions when the maximum height of a paraxial marginal ray, passing through a lens surface, from the light axis at a location closer to the object side than the aperture is greater than a maximum height of the paraxial marginal ray, passing through a lens surface, from the light axis at a location closer to the image side than the aperture:

$$-0.0015 \times vd + 0.6425 < \theta gF, \text{ and}$$

$$60 < vd$$

where vd is the Abbe number and $\theta gF$ is the partial dispersion ratio.

27. An image pickup apparatus comprising:
the photographing optical system of claim 26; and
a photoelectric conversion element that receives an image formed by the photographing optical system.

28. A photographing optical system comprising:
a positive lens and a diffractive optical element being provided closer to the object side of the system than the intersection (P) of the light axis and a paraxial chief ray; and
a negative lens provided closer to the image side of the system than the intersection (P),
wherein the positive lens and the negative lens are both formed of materials satisfying the following two conditions when the maximum height of a paraxial marginal ray, passing through a lens surface, from the light axis at a location closer to the object side than the intersection (P) is greater than a maximum height of the paraxial marginal ray, passing through a lens surface, from the light axis at a location closer to the image side than the intersection (P):

$$-0.0015 \times vd + 0.6425 < \theta gF, \text{ and}$$

$$60 < vd$$

where vd is the Abbe number and $\theta gF$ is the partial dispersion ratio.

29. A photographing optical system comprising:
a positive lens and a diffractive optical element being provided closer to the object side of the system than an aperture; and
a negative lens provided closer to the image side of the system than the aperture,
wherein the positive lens and the negative lens are both formed of materials satisfying the following two conditions when the maximum height of a paraxial marginal ray, passing through a lens surface, from the light axis at a location closer to the object side than the aperture is greater than a maximum height of the paraxial marginal ray, passing through a lens surface, from the light axis at a location closer to the image side than the aperture:

$$-0.0015 \times vd - 0.6425 < \theta gF, \text{ and}$$

$$60 < vd$$

where vd is the Abbe number and $\theta gF$ is the partial dispersion ratio.

* * * * *